(12) United States Patent
Shehata et al.

(10) Patent No.: US 12,468,386 B2
(45) Date of Patent: Nov. 11, 2025

(54) INTRA-FRAME PAUSE AND DELAYED EMISSION TIMING FOR FOVEATED DISPLAYS

(71) Applicant: Apple Inc., Cupertino, CA (US)

(72) Inventors: Shereef Shehata, San Ramon, CA (US); Jim C Chou, San Jose, CA (US); Shengchang Cai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 18/470,932

(22) Filed: Sep. 20, 2023

(65) Prior Publication Data
US 2024/0402797 A1   Dec. 5, 2024

Related U.S. Application Data

(60) Provisional application No. 63/505,843, filed on Jun. 2, 2023.

(51) Int. Cl.
*G06F 3/13* (2006.01)
*G06F 3/01* (2006.01)
*G06T 3/40* (2024.01)

(52) U.S. Cl.
CPC .............. *G06F 3/013* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 10,262,387 B2 | 4/2019 | Spitzer et al. | |
| 10,403,049 B2 | 9/2019 | Khalid et al. | |
| 10,754,163 B2 | 8/2020 | Lee et al. | |
| 10,802,287 B2 | 10/2020 | Selan | |
| 11,194,391 B2 | 12/2021 | Zhang et al. | |
| 11,222,444 B2 | 1/2022 | Young et al. | |
| 11,474,359 B2 | 10/2022 | Samec et al. | |
| 11,727,892 B1 * | 8/2023 | Wang | G06T 3/4053 345/84 |
| 2021/0141449 A1 * | 5/2021 | Zhang | G06F 3/013 |

FOREIGN PATENT DOCUMENTS

WO    WO-2019067157 A1 *   4/2019   .............. G06F 3/013

* cited by examiner

*Primary Examiner* — Samuel D Fereja
(74) *Attorney, Agent, or Firm* — Fletcher Yoder, P.C.

(57) ABSTRACT

Embodiments presented herein relate to reducing perceivable image artifacts on an electronic display caused by variances in emission timing of emission groups, and more specifically, to emission techniques that can be used with foveated content, such as dynamically foveated content. For example, an image frame may be divided into multiple foveation regions based on viewing characteristics, such as a viewer's gaze. To improve perceived image quality, a first foveation region may use a higher pixel resolution while a second foveation region may use a lower pixel resolution, which may result in differences in programming time. As such, one or more intra-frame pauses may be used when programming the second foveation region to delay emission timing of the second foveation region. In this way, programming time for the image frame may be more consistent and perceivable image artifacts from frame to frame may be reduced.

20 Claims, 16 Drawing Sheets

INTRA-FRAME PAUSE AND DELAYED EMISSION TIMING FOR FOVEATED DISPLAYS

CROSS-REFERENCE TO RELATED APPLICATION

This application claims priority to U.S. Application No. 63/505,843, entitled "INTRA-FRAME PAUSE AND DELAYED EMISSION TIMING FOR FOVEATED DISPLAYS," filed Jun. 2, 2023, which is hereby incorporated by reference in its entirety for all purposes.

SUMMARY

A summary of certain embodiments disclosed herein is set forth below. It should be understood that these aspects are presented to provide the reader with a brief summary of these certain embodiments and that these aspects are not intended to limit the scope of this disclosure. Indeed, this disclosure may encompass a variety of aspects that may not be set forth below.

The present disclosure relates generally to emission techniques that can be used with foveated content, such as dynamically foveated content. Foveation refers to a technique in which the amount of detail or resolution is varied across a frame of image content based on a fixation point, such as a point or area within the frame itself, a point or region of the frame on which a viewer's eyes are focused or based on the movement of the viewer's eyes. More specifically, the amount of detail can be varied by using different resolutions in various portions of the frame. For example, in static foveation, the size and location of the various resolution areas of an electronic display are fixed. As another example, in dynamic foveation, the areas of the electronic display at which the various resolutions are used may change between two or more frames based on the viewer's gaze. For example, in content that uses multiple frames, such as videos and video games, the content may be presented to viewers by displaying the frames in rapid succession. In other words, the portions of the electronic display in which the content is displayed with relatively high and low resolutions may change between the frames.

The resolution areas may be generated based on a number of pixel rows being programmed during a period of time. For example, the high-resolution area may match the (e.g., full) pixel resolution of the electronic display, while the low-resolution area may correspond to less than the pixel resolution. That is, the high-resolution area may be generated by individually programming the pixel rows while the low-resolution area may be generated by concurrently programming two or more pixel rows. As such, the emission timing of the high-resolution area may be slower and/or longer than the emission timing of the low-resolution area. When displaying dynamically foveated content, the variation in emission timing may cause perceivable image artifacts, such as flickering between the frames.

Accordingly, to reduce and/or eliminate image artifacts perceived by the user, delayed emission timing techniques are provided. More specifically, by inserting one or more intra-frame pauses during programming of the various resolution areas, more uniform emission timing may be achieved between the various resolution areas as well as between frames. As used herein, pausing the programming of a pixel row and/or a group of two or more pixel rows is generally referred to as an "intra-frame pause." For example, one or more intra-frame pauses may be used when programming one or more pixel rows of the low-resolution area such that emission timing may substantially match the emission timing of the high-resolution area. In another example, one or more intra-frame pauses may be used when programming pixel rows of the high-resolution area and two or more intra-frame pauses may be used when programming pixel rows of the low-resolution area to provide for more uniform emission timing. The length and/or location of the intra-frame pauses for successive frames may be determined based on the viewer's gaze position, the foveation characteristics of the electronic display, and the like. In this way, variation in emission timing between frames may be improved and perceivable image artifacts may be reduced or eliminated.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

Figure 1:
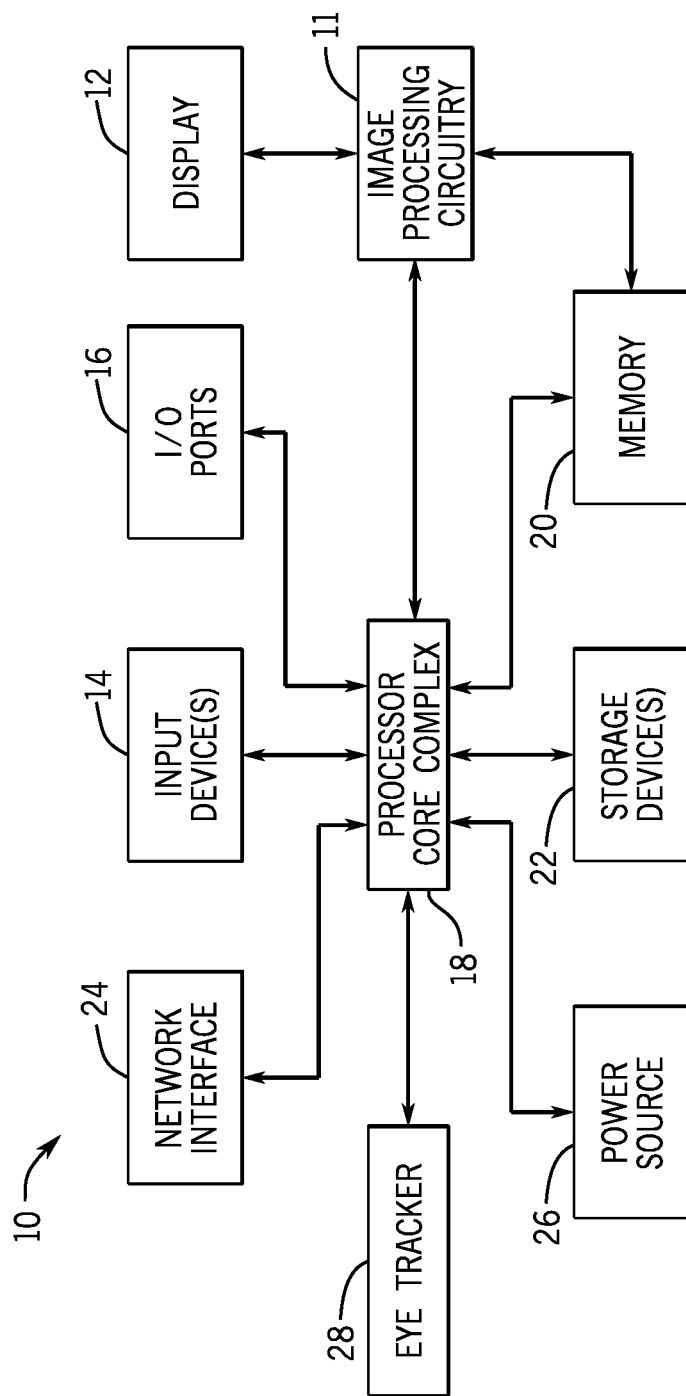
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use one or more electronic displays to present visual information such as text, still images, and/or video by displaying one or more images. To display an image, an electronic display may control light emission of its display pixels based at least in part on corresponding image data. The electronic display may write the image data to the display pixels and drive the display pixel to emit light based on the image data. In an embodiment, the electronic display may be a foveated display that displays dynamically foveated content. To this end, the electronic display may write foveated image data to the display pixels based on viewing characteristics.

With the foregoing in mind, a human's eye generally perceives visible light due to the interaction of cones (e.g., photoreceptor cells) in its retina with corresponding light rays. However, a human's eye generally has a limited field of view (FOV), which is centered on its viewing (e.g., gaze or pupil) angle. Due to its limited field of view, at least in some instances, a human's eye may perceive a first portion of light emitted from a display pixel, but not a second portion of the light emitted from the display pixel, for example, due to light rays in the second portion of the emitted light not actually reaching the eye's retina and, thus, being outside its field of view. In other words, luminance perceived by a human's eye may generally be dependent on its field of view.

However, the field of view of a human's eye may generally vary with its viewing characteristics, such as viewing (e.g., gaze or pupil) angle, viewing location (e.g., pupil offset from center and/or pupil relief), and/or viewing aperture (e.g., pupil or eye box) size. For example, orientation (e.g., direction) of the field of view of a human's eye may be dependent on its gaze (e.g., viewing or pupil) angle and, thus, a change in its gaze angle (e.g., due to eye rotation) may change the orientation of its field of view. Additionally or alternatively, size (e.g., span) of the field of view of a human's eye may be dependent on its pupil (e.g., viewing aperture or eye box) size and, thus, a change in its pupil size may change the size of its field of view.

As the viewing characteristics change, the foveated regions of the electronic display may also dynamically change. For example, portions of the electronic display corresponding to the field of view of the human's eye may be a high-resolution area and remaining portions of the electronic display may be a lower resolution area. For the high-resolution area, the foveated image data may correspond to each individual display pixel while the foveated image data may correspond to multiple display pixels in the low-resolution area. Individually programming the display pixels may use more programming time in comparison to programming multiple display pixels, which may cause differences in emission timing. In addition, the dynamical adjustment of the resolution areas may increase the differences in emission timing, which may result in perceivable image artifacts by the viewer.

Embodiments of the present disclosure relate to reducing or eliminating perceivable image artifacts by delaying emissions of certain display pixels by inserting one or more intra-frame pauses. More specifically, by inserting one or more intra-frame pauses during the programming, more uniform emission timing may be achieved between the various resolution areas as well as between frames.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is one example of a particular implementation and is intended to illustrate the types of components that may be present in an electronic device 10.

The electronic device 10 includes the electronic display 12, image processing circuitry 11, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and eye tracker 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting the occurrence or position of an object touching the surface of the electronic display 12.

In addition to enabling user inputs, the electronic display 12 may be a display panel with one or more display pixels. For example, the electronic display 12 may include a self-emissive pixel array having an array of one or more self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. Before being used to display a corresponding image on the electronic display 12, the image data may be processed via the image processing circuitry 11. The image processing circuitry 11 may process the image data for display on one or more electronic displays 12. For example, the image processing circuitry 11 may include a display pipeline, memory-to-memory scaler and rotator (MSR) circuitry, warp compensation circuitry, or additional hardware or software means for processing image data. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image processing circuitry 11 may be implemented in the electronic device 10, in the electronic display 12, or a combination thereof. For example, the image processing circuitry 11 may be included in the processor core complex 18, a timing controller (TCON) in the electronic display 12, or any combination thereof.

In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

The eye tracker 28 may measure positions and movement of one or both eyes of someone viewing the electronic display 12 of the electronic device 10. For instance, the eye tracker 28 may include a sensor (e.g., a camera) that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. Accordingly, the eye tracker 28 may output viewing characteristic parameters indicative of viewing characteristics with which a user's eye is viewing or is expected to view on the electronic display 12. For example, the viewing characteristic parameters may indicate a horizontal (e.g., x-direction) offset of the eye's pupil from a default (e.g., forward facing) pupil position and a vertical (e.g., y-direction) offset of the eye's pupil from the default pupil position and, thus, may be indicative of expected viewing angle. Additionally or alternatively, the viewing characteristic parameters may indicate a pupil relief (e.g., distance from pupil to display panel) and, thus, may be indicative of the expected viewing location. The processor core complex 18 may use the gaze angle(s) of the eyes of the viewer when generating image data for display on the electronic display 12.

Figure 2:
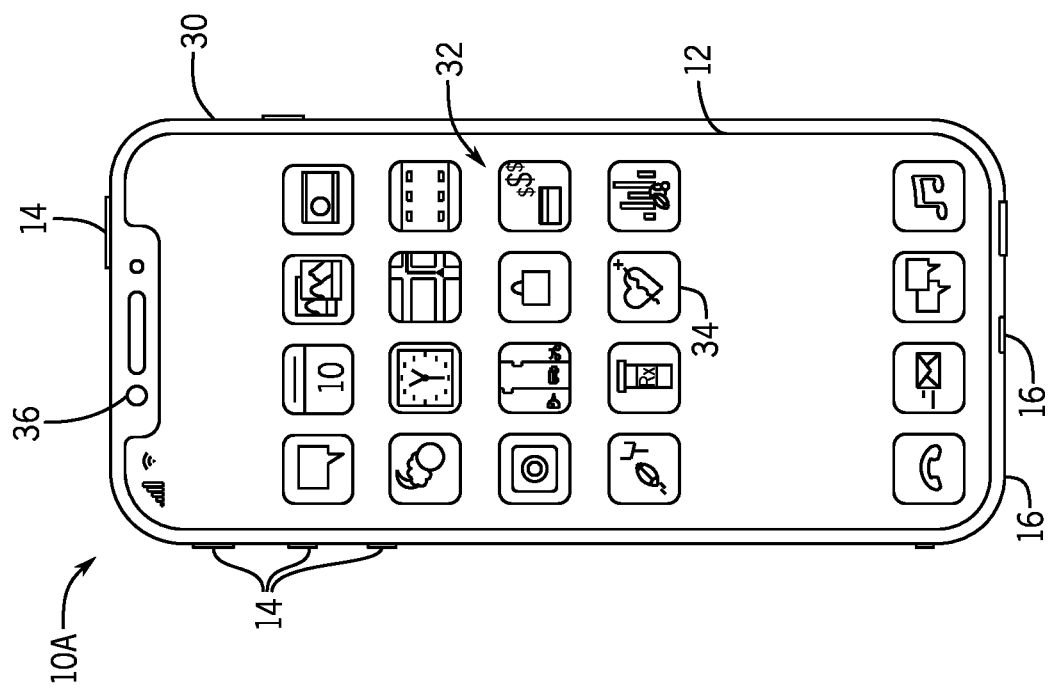
FIG. 2 is a perspective view of a notebook computer representing an embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as any iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch. The handheld device 10A includes one or more cameras 36 for capturing images.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
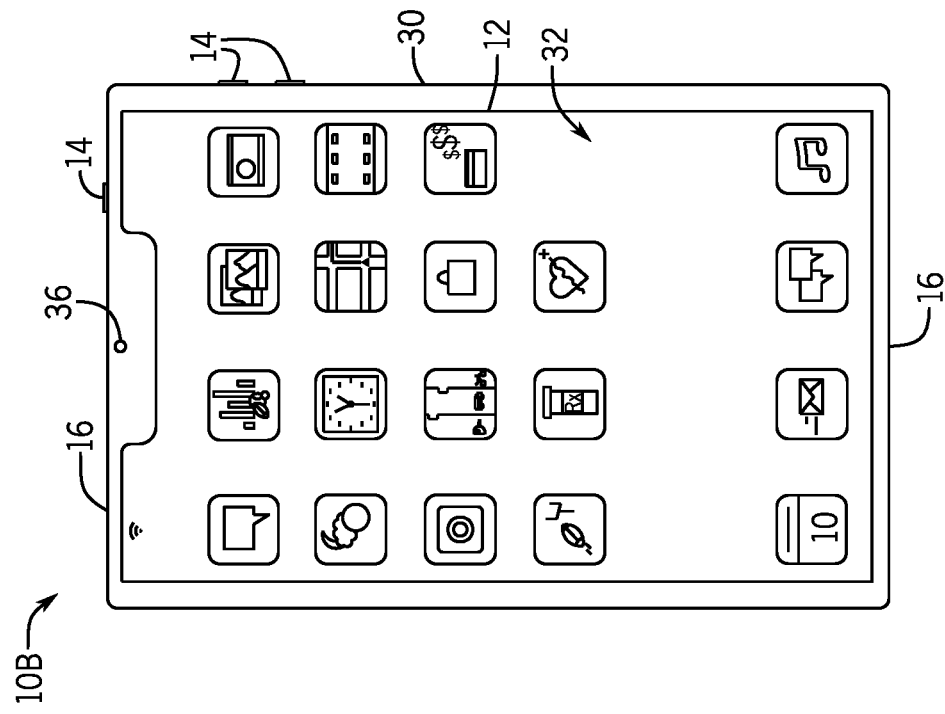
FIG. 3 is a front view of a handheld device representing another embodiment of the electronic device of FIG. 1.
Figure 4:
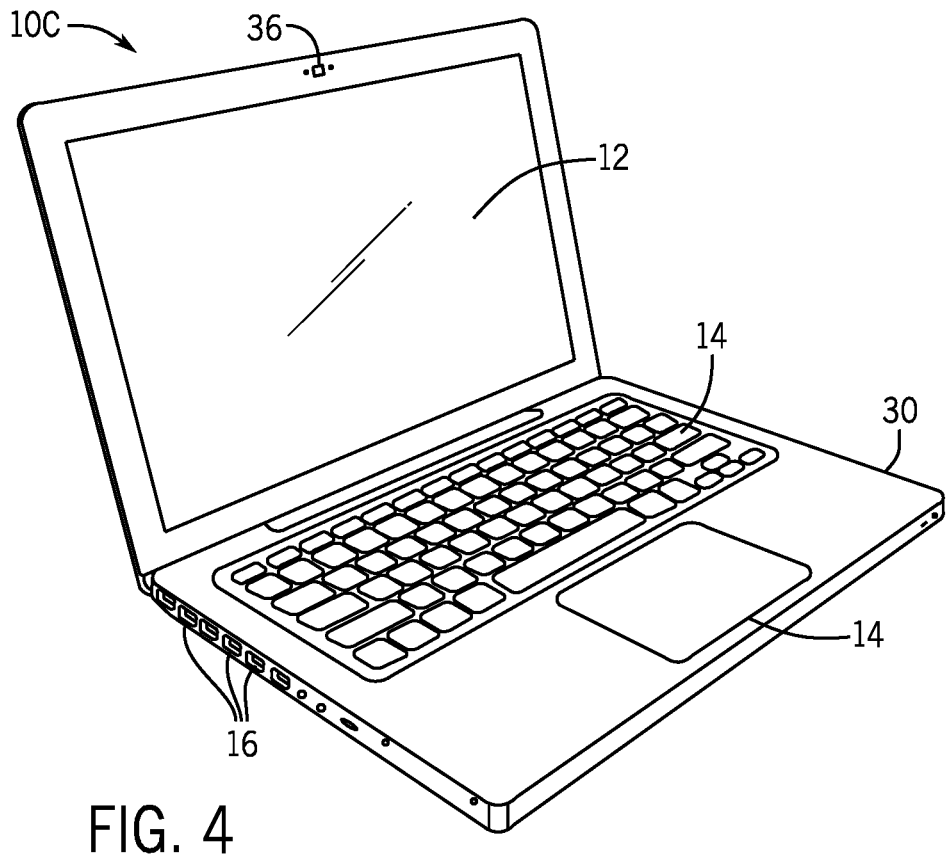
FIG. 4 is a front view of another handheld device representing another embodiment of the electronic device of FIG. 1.
Figure 5:
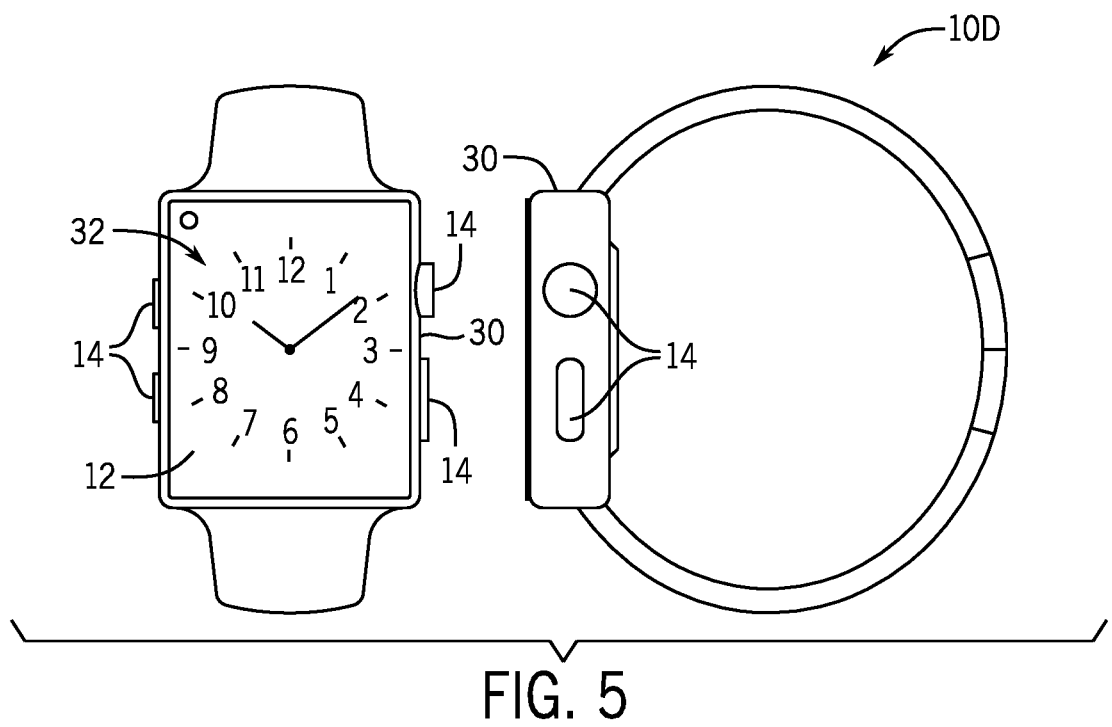
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a wearable electronic device 10D, is shown in FIG. 5. For illustrative purposes, the wearable electronic device 10D may be any Apple Watch® model available from Apple Inc. As depicted, the tablet device 10B, the computer 10C, and the watch 10D each also include an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
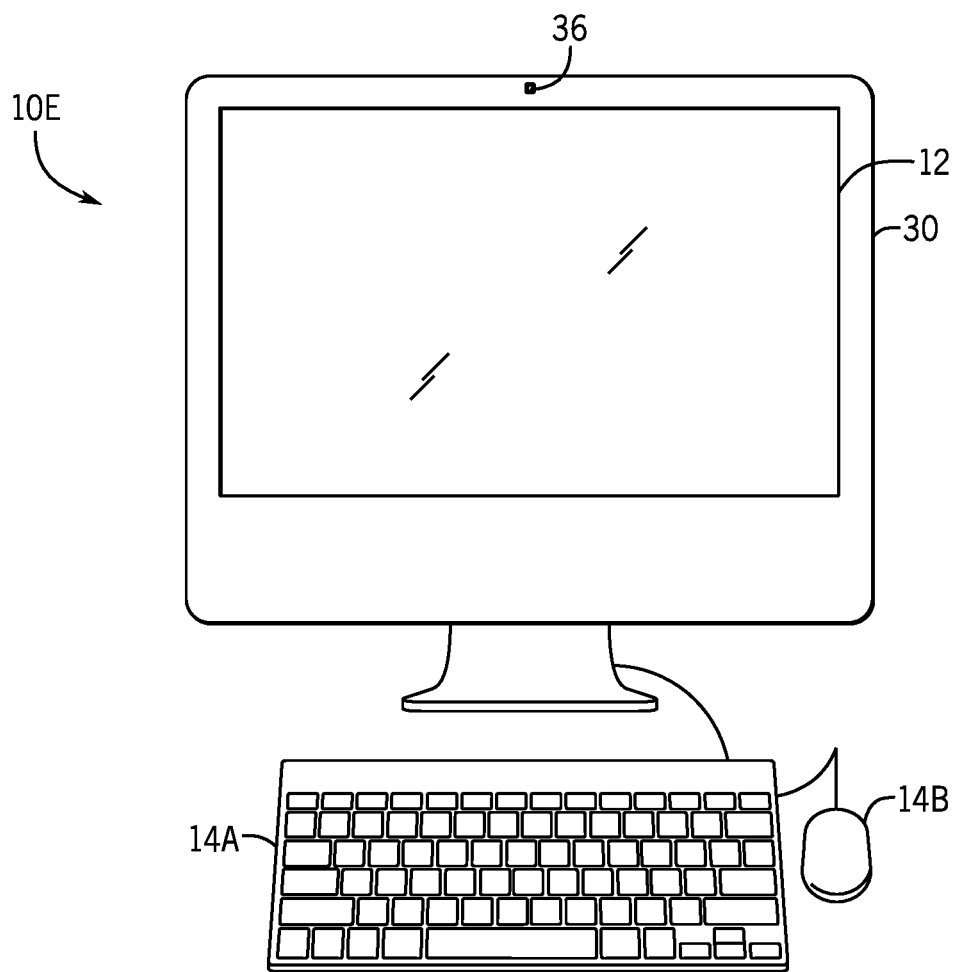
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Certain electronic displays 12, known as "foveated" displays, display images at a higher resolution where a viewer is looking and at lower resolution in the peripheral vision of the viewer. The image data for foveated displays thus may have some pixels that are grouped (e.g., foveation regions) together to display the same image data. In particular, in the foveated domain, an image frame may be divided into multiple foveation regions (e.g., tiles) in which different pixel resolutions are utilized.

Figure 7:
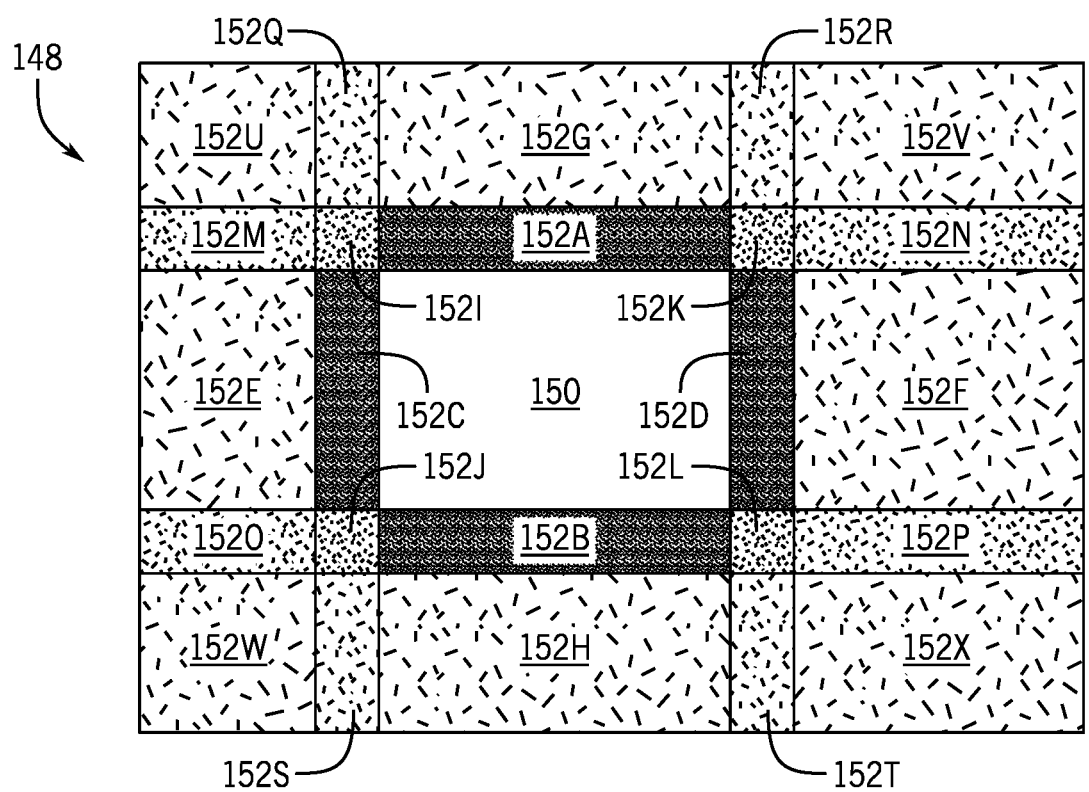
FIG. 7 is a block diagram of an example portion of the electronic device of FIG. 1 including an electronic display illustrating foveated regions, according to embodiments of the present disclosure.

To help illustrate, an example of an image frame 148 divided into multiple foveation regions is shown in FIG. 7. As depicted, a central foveation region 150 is identified in the image frame 148, which is displayed on the electronic display 12 (e.g., electronic panel). Additionally, as depicted, multiple outer foveation regions 152 outside of the central foveation region 150 are identified in the image frame 148.

In some embodiments, the central foveation region 150 and one or more outer foveation regions 152 may be identified based at least in part on a field of view (FOV) with which the electronic display 12 is expected to be viewed and, thus, based at least in part on viewing characteristics (e.g., viewing angle and/or viewing location) with which the electronic display 12 is expected to be viewed. For example, the viewing characteristics may be indicated by one or more viewing characteristic parameters received from the eye tracker 28. In particular, in such embodiments, the central foveation region 150 may be identified in the image frame 148 such that the central foveation region 150 is co-located with a focus region of the field of view (FOV). In addition, an outer foveation region 152 is identified in the image frame 148 such that the outer foveation region 152 is co-located with a periphery region of the field of view. In other words, the depicted example may be identified when the focus region of the field of view is expected to be centered on a central portion of the electronic display 12.

In some embodiments, a change in viewing characteristics may change the field of view and, thus, characteristics (e.g., size, location, and/or pixel resolution) of foveation regions identified in the image frame 148. For example, a change in viewing angle may move the focus region on the electronic display 12, which may result in the central foveation region 150 being shifted relative to the center of the image frame 148. Additionally or alternatively, a change in viewing location that increases size of the focus region may result in size of central foveation region 150 being expanded (e.g., increased), while a change in viewing location that decreases size of the focus region may result in the size of central foveation region 150 being contracted (e.g., decreased or reduced).

In some embodiments, the pixel resolution used in the central foveation region 150 may maximize pixel resolution implemented on the electronic display 12 to improve perceived image quality. In other words, in some embodiments, the central foveation region 150 may utilize a pixel resolution that matches the (e.g., full) pixel resolution of the electronic display 12. That is, in such embodiments, each image pixel (e.g., image data corresponding with a point in the image) in the central foveation region 150 of the image frame 148 may correspond with a single display pixel (e.g., set of one or more color component sub-pixels) implemented on the electronic display 12. In some embodiments, each outer foveation region 152 in the image frame 148 may utilize a pixel resolution lower than the pixel resolution of the central foveation region 150 and, thus, the (e.g., full) pixel resolution of the electronic display 12. In other words, in such embodiments, each image pixel (e.g., image data corresponding with a point in the image) in an outer foveation region 152 of the image frame 148 may correspond with multiple display pixels implemented on the electronic display 12.

To account for variation in sensitivity to visible light outside the focus region, in some embodiments, different outer foveation regions 152 identified in the image frame 148 may utilize different pixel resolutions. In particular, in such embodiments, an outer foveation region 152 closer to the central foveation region 150 may utilize a higher pixel resolution. On the other hand, in such embodiments, an outer foveation region 152 farther from the central foveation region 150 may utilize a lower pixel resolution.

As an illustrative example, a first set of outer foveation regions 152 may include each outer foveation region 152 directly adjacent to and outside the central foveation region 150 (e.g., having a 1×1 pixel resolution). In other words, with regard to the depicted example, the first set of outer foveation regions 152 may include a first outer foveation region 152A (e.g., having 1×2 pixel resolution), a second outer foveation region 152B (e.g., having 1×2 pixel resolution), a third outer foveation region 152C (e.g., having 2×1 pixel resolution), and a fourth outer foveation region 152D (e.g., having 2×1 pixel resolution). Due to proximity to the central foveation region 150, in some embodiments, each outer foveation region 152 in the first set of outer foveation regions 152 may utilize a pixel resolution that is half the pixel resolution of the central foveation region 150 and, thus, the (e.g., full) pixel resolution of the electronic display 12. In other words, in such embodiments, each image pixel (e.g., image data corresponding with a point in the image) in the first set of outer foveation regions 152 may correspond with two display pixels (e.g., sets of one or more color component sub-pixels) implemented on the electronic display 12.

Additionally, as an illustrative example, a second set of outer foveation regions 152 may include each outer foveation region 152 directly adjacent and outside the first set of outer foveation regions 152. In other words, with regard to the depicted example, the second set of outer foveation regions 152 may include a fifth outer foveation region 152E (e.g., having a 1×4 pixel resolution), a sixth outer foveation region 152F (e.g., having a 1×4 pixel resolution), a seventh outer foveation region 152G (e.g., having a 1×4 pixel resolution), an eighth outer foveation region 152H (e.g., having a 1×4 pixel resolution), a ninth outer foveation region 152I (e.g., having a 2×2 pixel resolution), a tenth outer foveation region 152J (e.g., having a 2×2 pixel resolution), an eleventh outer foveation region 152K (e.g., having a 2×2 pixel resolution), and a twelfth outer foveation region 152L (e.g., having a 2×2 pixel resolution). Due to being located outside of the first set of outer foveation regions 152, in some embodiments, each outer foveation region 152 in the second set of outer foveation regions 152 may utilize a pixel resolution that is half the pixel resolution of the first set of outer foveation regions 152 and, thus, a quarter of the pixel resolution of the central foveation region 150 and the electronic display 12. In other words, in such embodiments, each image pixel (e.g., image data corresponding with a point in the image) in the second set of outer foveation regions 152 may correspond with four display pixels (e.g., sets of one or more color component sub-pixels) implemented on the electronic display 12.

Furthermore, as an illustrative example, a third set of outer foveation regions 152 may include each outer foveation region 152 directly adjacent to and outside the second set of outer foveation regions 152. In other words, with regard to the depicted example, the third set of outer foveation regions 152 may include a thirteenth outer foveation region 152M (e.g., having 4×2 a pixel resolution), a fourteenth outer foveation region 152N (e.g., having a 4×2 pixel resolution), a fifteenth outer foveation region 152O (e.g., having a 4×2 pixel resolution), a sixteenth outer foveation region 152P (e.g., having a 4×2 pixel resolution), a seventeenth outer foveation region 152Q (e.g., having a 2×4 pixel resolution), an eighteenth outer foveation region 152R (e.g., having a 2×4 pixel resolution), a nineteenth outer foveation region 152S (e.g., having a 2×4 pixel resolution), and a twentieth outer foveation region 152T (e.g., having a 2×4 pixel resolution). Due to being located outside of the second set of outer foveation regions 152, in some embodiments, each outer foveation region 152 in the third set of outer foveation regions 152 may utilize a pixel resolution that is half the second set of outer foveation regions 152 and, thus, an eighth of the pixel resolution of the central foveation region 150 and the electronic display 12. In other words, in such embodiments, each image pixel (e.g., image data corresponding with a point in the image) in the third set of outer foveation regions 152 may correspond with eight display pixels (e.g., sets of one or more color component sub-pixels) implemented on the electronic display 12.

Moreover, as an illustrative example, a fourth set of outer foveation regions 152 may include each outer foveation region 152 directly adjacent and outside the third set of outer foveation regions 152. In other words, with regard to the depicted example, the second set of outer foveation regions 152 may include a twenty-first outer foveation region 152U (e.g., having a 4×4 pixel resolution), a twenty-second outer foveation region 152V (e.g., having a 4×4 pixel resolution), a twenty-third outer foveation region 152W (e.g., having a 4×4 pixel resolution), and a twenty-fourth outer foveation region 152X (e.g., having a 4×4 pixel resolution). Due to being located outside of the third set of outer foveation regions 152, in some embodiments, each outer foveation region 152 in the fourth set of outer foveation regions 152 may utilize a pixel resolution that is half the pixel resolution of the third set of outer foveation regions 152 and, thus, a sixteenth of the pixel resolution of the central foveation region 150 and the electronic display 12. In other words, in such embodiments, each image pixel (e.g., image data corresponding with a point in the image) in the fourth set of outer foveation regions 152 may correspond with sixteen display pixels (e.g., sets of one or more color component sub-pixels) implemented on the electronic display 12.

Figure 8:
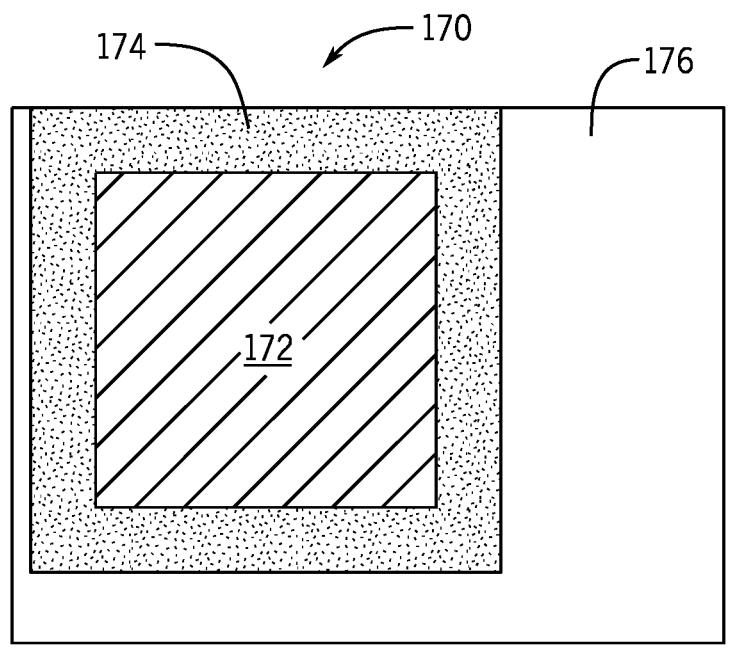
FIG. 8 is a diagram of the electronic device of FIG. 1 including the electronic display in which static foveation is utilized, according to embodiments of the present disclosure.

With the foregoing in mind, FIG. 8 is a diagram 170 representative of the electronic display 12 utilizing static foveation. In static foveation, the size and location of the various resolution areas of the electronic display 12 are fixed. In the illustrated embodiment, the electronic display 12 includes a high-resolution area 172 (e.g., 1×1 pixel resolution, 2×1 pixel resolution, 4×1 pixel resolution), a medium-resolution area 174 (e.g., 1×2 pixel resolution, 2×2 pixel resolution, 4×2 pixel resolution), and a low-resolution area 176 (e.g., 1×4 pixel resolution, 2×4 pixel resolution, 4×4 pixel resolution). By way of example, the high-resolution area 172 may include the central foveation region 150 and the medium-resolution area 174 and/or the low-resolution area 176 may include one or more outer foveation regions 152. In other embodiments, there may be two resolution areas (e.g., a higher-resolution area and a lower-resolution area), four or more resolution areas, five or more resolution areas, and so on.

As described above, electronic displays such as the electronic display 12 may also use dynamic foveation. In dynamic foveation, the areas of the electronic display 12 at which the various resolutions are used may change between two or more frames (e.g., images) based on viewing characteristics. For example, in content that uses multiple images, such as videos and video games, the content may be presented to viewers by displaying the images in rapid succession. The portions of the electronic display 12 in which the content is displayed with a relatively high and low resolution may change, for instance, based on data collected by the eye tracker 28, such as where the viewer's gaze is focused.

Figure 9:
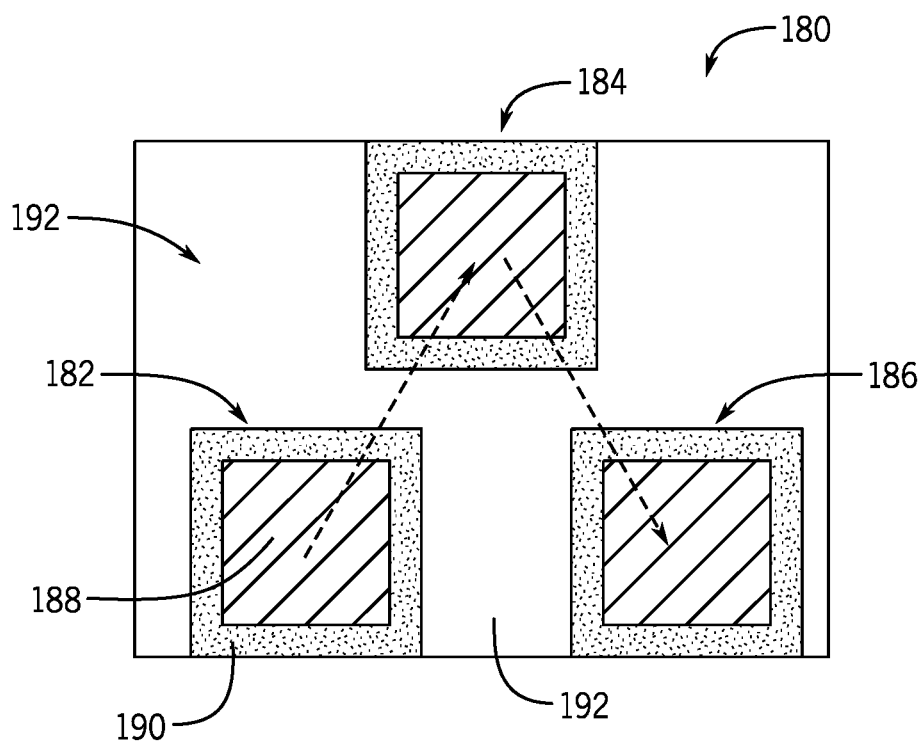
FIG. 9 is a diagram of the electronic device of FIG. 1 including the electronic display in which dynamic foveation is utilized, according to embodiments of the present disclosure.

With this in mind, FIG. 9 shows a diagram 180 that illustrates portions of the electronic display 12 associated with a first frame of content 182, a second frame of content 184, and a third frame of content 186. For each of the frames 182, 184, 186, a high-resolution area 188, medium-resolution area 190, and low-resolution area 192 are utilized. During a transition from the first frame of content 182 to the second frame of content 184, the high-resolution area 188 and medium-resolution area 190 shift from being positioned near the bottom left corner of the electronic display 12 to the top central part of the electronic display 12 as the viewer's gaze similarly shifts. Similarly, the high-resolution area 188 and medium-resolution area 190 shift towards the bottom right corner of the electronic display 12 with the viewer's gaze when the third frame 186 is displayed.

Figure 10:
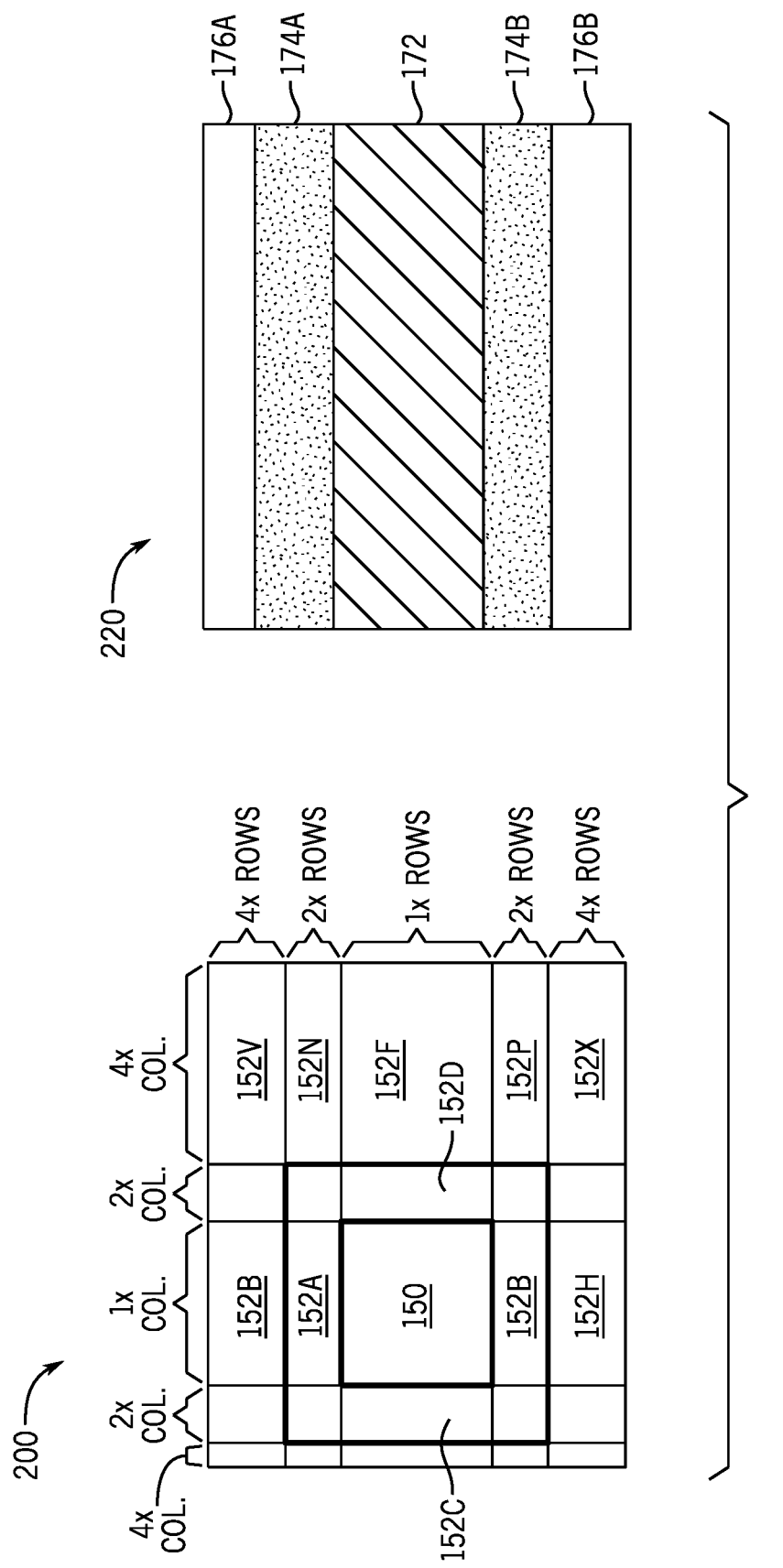
FIG. 10 is a diagram of the electronic device of FIG. 1 including the electronic display illustrating the foveated regions, according to embodiments of the present disclosure.

FIG. 10 is an image frame 200 divided into foveation regions based on the viewer's gaze at a center portion of the electronic display 12 and a diagram 220 representative of corresponding resolution areas on the electronic display 12. As discussed herein, the foveation regions may be adjusted based on the viewing characteristics. The image frame 200 is substantially similar to the image frame 148 described with respect to FIG. 7 except that the central foveation region 150 is shifted slightly to the left, which may be based on the viewing characteristics. As illustrated, the shifting may cause certain outer foveation regions 152 to not be used in the image frame 200, such as portions of the fifth outer foveation region 152E, the thirteenth outer foveation region 152M, the fifteenth outer foveation region 152O, the twenty-first outer foveation region 152U, and the twenty-third outer foveation region 152W. The shifting may also adjust a size of certain outer foveation regions 152, such as the sixth outer foveation regions 152F, the fourteenth outer foveation regions 152N, the sixteenth outer foveation regions 152P, the twenty-second outer foveation regions 152V, and the twenty-fourth outer foveation regions 152X. In this way, positioning of the foveation regions may be adjusted from frame to frame based on the viewing characteristics.

The diagram 220 illustrates the various resolution areas of the electronic display 12 when the viewer's gaze is at the center. As illustrated, the high-resolution area 172 may be positioned in the center of the electronic display 12, a first medium-resolution area 174A is adjacent to a top edge of the high-resolution area 172, and a first low-resolution area 176A is adjacent to the first medium-resolution area 174A and a first edge (e.g., top edge) of the electronic display 12. Similarly, a second medium-resolution area 174B is adjacent a bottom edge of the high-resolution area 172 and a second low-resolution area 176B is adjacent to the second medium-resolution area 174B and a second edge (e.g., bottom edge) of the electronic display 12. The high-resolution area 172 may utilize the (e.g., full) pixel resolution of the electronic display 12 while the medium-resolution areas 174 and/or the low-resolution areas 176 may utilize a pixel resolution less than the pixel resolution of the electronic display 12. For example, the medium-resolution areas 174 may use a pixel resolution that is half the pixel resolution of the high-resolution area 172 and the low-resolution areas 176 may use a pixel resolution that is half the pixel resolution of the medium-resolution areas 174. However, in other embodiments, the medium-resolution areas and/or the low-resolution areas 176 may use any suitable pixel resolution that is less than the high-resolution area 172, such as ⅓ the pixel resolution, ⅕ the pixel resolution, ⅙ the pixel resolution, and so on.

Figure 11:
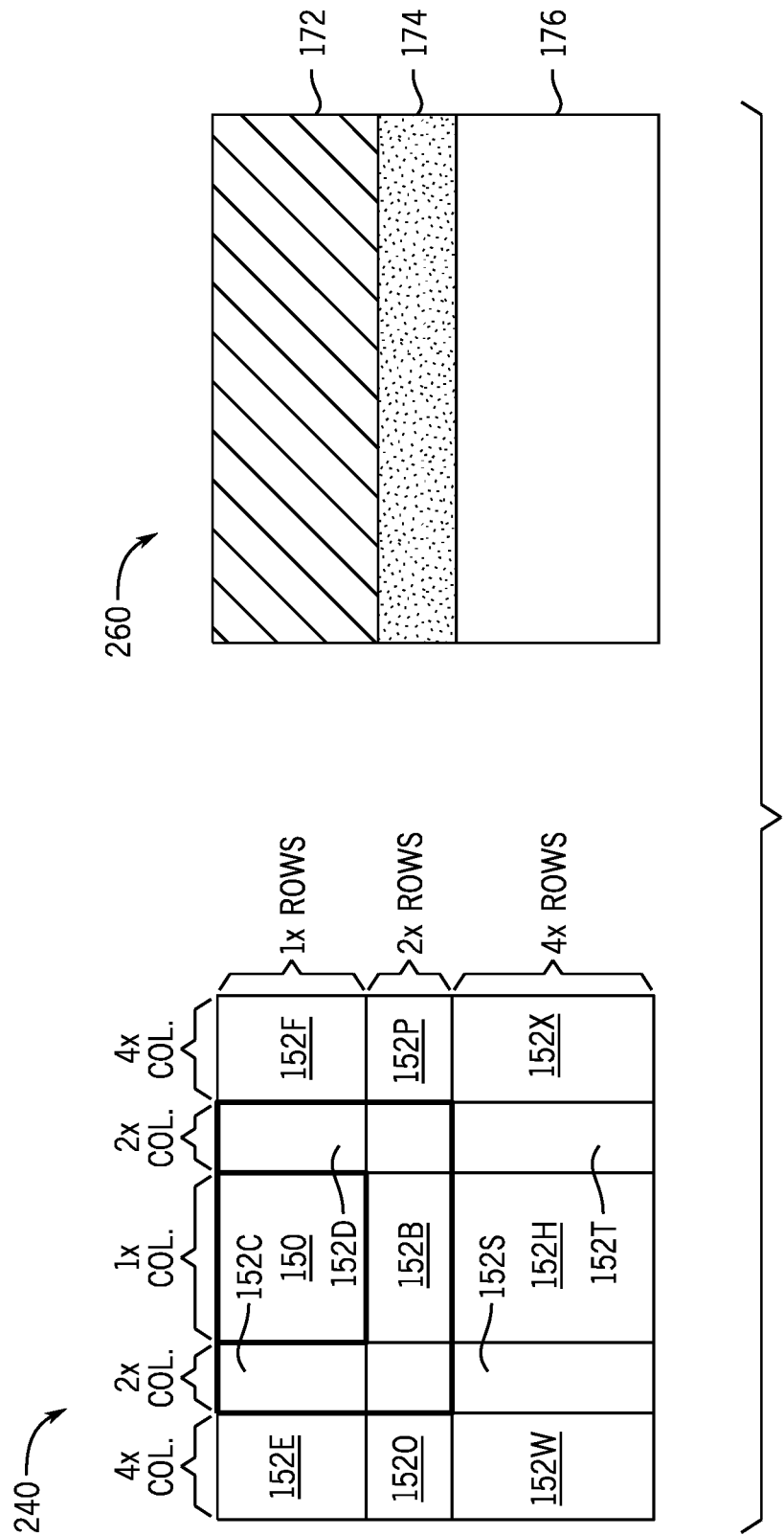
FIG. 11 is a diagram of the electronic device of FIG. 1 including the electronic display illustrating the foveated regions, according to embodiments of the present disclosure.

FIG. 11 is an image frame 240 divided into foveation regions based on the viewer's gaze at a top portion of the electronic display 12 and a diagram 260 representative of corresponding resolution areas on the electronic display 12. As discussed herein, changes in viewing characteristics may adjust a size and/or a position of the foveated regions. For example, the eye tracking data may indicate that the viewer's gaze angle is 10 degrees, 15 degrees, 20 degrees, 25 degrees, and the like, which may correspond to the top portion of the electronic display 12. As such, the central foveation region 150 may be positioned adjacent to a first edge of the electronic display 12 based on the eye tracking data. In addition, a first set of outer foveation regions 152 (e.g., the second outer foveation region 152B, the tenth outer foveation region 152J, the twelfth outer foveation region 152L, the fifteenth outer foveation region 152O, and the sixteenth outer foveation region 152P) may be adjacent to the central foveated region 150 and utilize a pixel resolution lower than the pixel resolution of the central foveation region 150. For example, the pixel rows directly adjacent and outside the central foveation region 150 may utilize a pixel resolution that is half the pixel resolution of the central foveation region 150.

Additionally, a second set of outer foveation regions 152 (e.g., the eighth outer foveation region 152H, the nineteenth outer foveation region 152S, the twentieth outer foveation region 152T, the twenty-third outer foveation region 152W, the twenty-fourth outer foveation region 152X) may utilize a pixel resolution that is half the pixel resolution of the first set of outer foveation regions 152.

Since the central foveation region 150 is adjacent to the first edge, certain outer foveation regions 152 may not be used in the image frame 240. For example, in the first set of outer foveation regions 152, the first outer foveation region 152A may not be used to display the image frame 240 and/or portions of the third outer foveation region 152C and/or the fourth outer foveation region 152D may not be used to display the image frame 240. Additionally or alternatively, a size of certain outer foveation regions 152 may be increased. For example, in the fourth set of outer foveation region 152, a size of the eighth outer foveation region 152H, the twenty-third outer foveation region 152W, and/or the twenty-fourth outer foveation region 152X may increase.

The diagram 220 illustrates the various resolution areas of the electronic display 12 when the viewer's gaze is at the top portion. The high-resolution area 172 is positioned at the first edge or a top portion of the electronic display 12 corresponding to the viewing characteristics. In certain instances, the high-resolution area 172 may correspond to the central foveation region 150 and/or one or more outer foveation regions 152 that individually program the pixel rows. In addition, the medium-resolution area 174 is directly adjacent to the high-resolution area 172 and the low-resolution area 176 is adjacent to the medium-resolution area 174.

Figure 12:
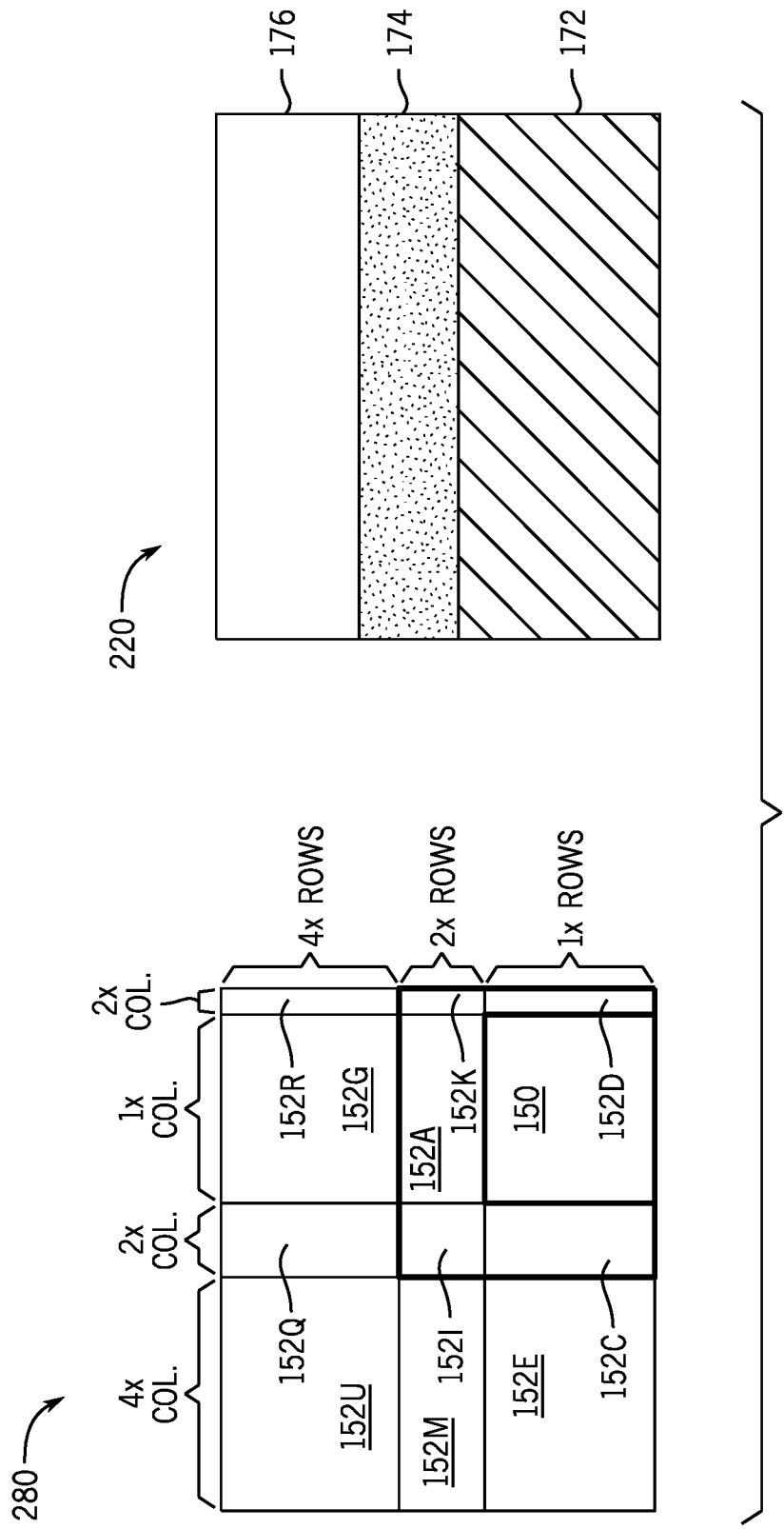
FIG. 12 is a diagram of the electronic device of FIG. 1 including the electronic display illustrating the foveated regions, according to embodiments of the present disclosure.

FIG. 12 is an image frame 280 divided into foveation regions based on the viewer's gaze at a bottom portion of the electronic display 12 and a diagram 290 representative of corresponding resolution areas on the electronic display 12. For example, the eye tracking data may indicate that the viewer's gaze angle is 45 degrees, 50 degrees, 60 degrees, 70 degrees, and the like, which may correspond to the bottom portion of the electronic display 12. As illustrated, the central foveation region 150 is positioned adjacent to a second edge (e.g., bottom) of the electronic display 12, a first set of outer foveation regions 152 are directly adjacent to the central foveation region 150 and a second set of outer foveation regions 152 are directly adjacent to the central foveation region 150. In the illustrated example, the fifth outer foveation region 152E and the twenty-first outer foveation region 152U may be the same size as the central foveation region 150.

The diagram 290 illustrates the various resolution areas when the viewer's gaze is at a bottom portion of the electronic display 12. As illustrated, the high-resolution area 172 may be positioned at a bottom portion of the electronic display 12, the medium-resolution area 174 may be adjacent to the high-resolution area 174, and the low-resolution area 176 may be adjacent to the medium-resolution area 174.

Figure 13:
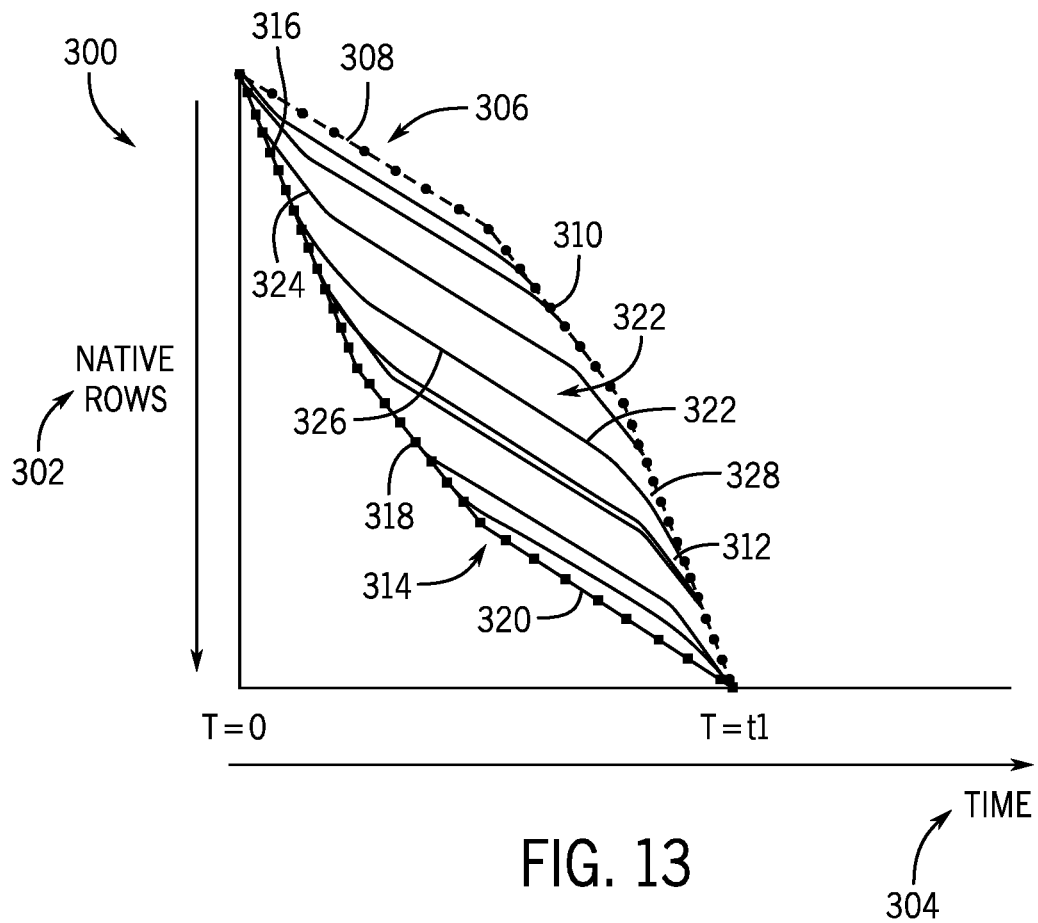
FIG. 13 is a diagram representing programming profiles without intra-frame pauses for different gaze angles, according to embodiments of the present disclosure.

Continuing with the drawings, FIG. 13 is a graph 300 representing programming profiles for the electronic display 12 without using intra-frame pausing and/or delayed emission techniques. In particular, the graph 300 illustrates programming native rows 302 of the electronic display 12 over time 304. As used herein, programming and driving the pixel rows to emit over a period of time is generally referred to as a "programming profile." From frame to frame, the native rows 302 may be programmed starting at a first native row and continuing sequentially to a last native row, such as from the top edge of the electronic display 12 to the bottom edge. The programming time for one image frame is from time T=0 to time T=t1.

As discussed herein, the foveation regions may be adjusted based on the viewing characteristics. As such, grouping of the native rows 302 into the foveation regions may change from frame to frame, which may change the programming profiles from frame to frame. In certain instances, variations in the programming profile may cause perceivable image artifacts, such as flickering between the frames.

With the foregoing in mind, a first programming profile 306 corresponds to programming the native rows 302 when the viewer's gaze is at the first edge (e.g., top portion). As discussed with respect to FIG. 11, the high-resolution area 172 may be positioned at the first edge, the medium-resolution area 174 adjacent to the high-resolution area 172, and the low-resolution area 176 positioned at the second edge. With this in mind, the first programming profile 306 includes a first line segment 308 illustrating the programming profile for native rows 302 in the high-resolution area 172, a second line segment 310 illustrating the programming profile for native rows 302 in the medium-resolution area 174, and a third line segment 312 illustrating the programming profile for native rows 302 in the low-resolution area. The first line segment 308 illustrates the programming profile for individually programming the native rows 102. The second segment 110 illustrates the programming profile for concurrently programming two native rows 102 and the third segment 112 illustrates the programming profile of concurrently programming four native rows 102.

As illustrated, the slope of the first line segment 308 is less steep in comparison to the slope of the second line segment 310 and/or the slope of the third line segment 312. In other words, programming the native pixels 302 within the high-resolution area 172 may take more time in comparison to programming the native pixels 302 within the medium-resolution area 174 and/or the low-resolution area 176 since each native row 302 is individually programmed.

The graph 300 also includes a second programming profile 314 of the electronic display 12 when the viewer's gaze is at the second edge (e.g., bottom portion). As discussed with respect to FIG. 12, the high-resolution area 172 may be positioned at the second edge, the medium-resolution area 174 adjacent to the high-resolution area 172, and the low-resolution area 176 positioned at the first edge. Similarly, the second programming profile 314 includes a first line segment 316 illustrating the programming profile for native rows 302 in the low-resolution area 176, a second line segment 318 illustrating the programming profile for native rows 302 in the medium-resolution area 174, and a third line segment 320 illustrating the programming profile for native rows 302 in the high-resolution area 172.

Since the size and/or positioning of the various resolution areas is dependent on viewing characteristics, the programming profiles of the native rows 302 will change as the resolution areas change. As such, the points in time during programming where image data is programmed into the native rows 302 may dynamically change from one frame to a subsequent frame. For example, the electronic display 12 may program a first frame of image content with the viewer's gaze at the first edge and subsequently program a second frame of image content with the viewer's gaze at the second edge. The variation in programming profiles may result in perceivable image artifacts from the first frame of image content to the second frame of image content due to the difference in programming times for different rows during the programming of each frame. Although the illustrated example uses resolution areas, it may be appreciated that the programming profiles may be applied to the foveation regions. That is, the central foveation region 150 may have a programming profile with a shallower slope in comparison to a programming profile of the outer foveation regions 152.

With the foregoing in mind, the graph 300 includes a third programming profile 322 illustrating the programming profile of the electronic display 12 when the viewer's gaze is at the center. As discussed with respect to FIG. 10, the high-resolution area 172 may be positioned in the center, two medium-resolution areas 174 adjacent to the high-resolution area 172, and two low-resolution areas 176 adjacent to a respective medium-resolution area 174. The third programming profile 322 may include a first segment 324 illustrating the programming profile for native rows 302 within the first low-resolution area 176A and the medium-resolution area 174A, a second line segment 326 illustrating the programming profile for native rows 302 within the high-resolution area 172, and a third line segment 328 illustrating the programming profile for native rows 302 within the second low-resolution area 176B and the medium-resolution area 174B. The second line segment 326 is between the first programming profile 306 and the second programming profile 314 and may represent an average programming time. As will be appreciated, the characteristics of the second line segment 326 are used to determine a length and/or a number of intra-frame pauses used during programming. That is, programming multiple frames with a programming profile similar or substantially similar to the second line segment may reduce or eliminate perceivable image artifacts since programming timing may be consistent between each of the frames.

Keeping the foregoing in mind, the present disclosure provides techniques that may be utilized to adjust programming profiles for foveated content, such as dynamically foveated content. For example, to reduce or eliminate variance in the programming profiles, one or more intra-frame pauses may be applied to delay emission timing of display pixels in certain foveation regions to adjust programming profiles. In this way, the consistency of programming timing from frame to frame may be improved. The techniques discussed herein may be incorporated into, or applied in conjunction with, such programming algorithms.

Figure 14:
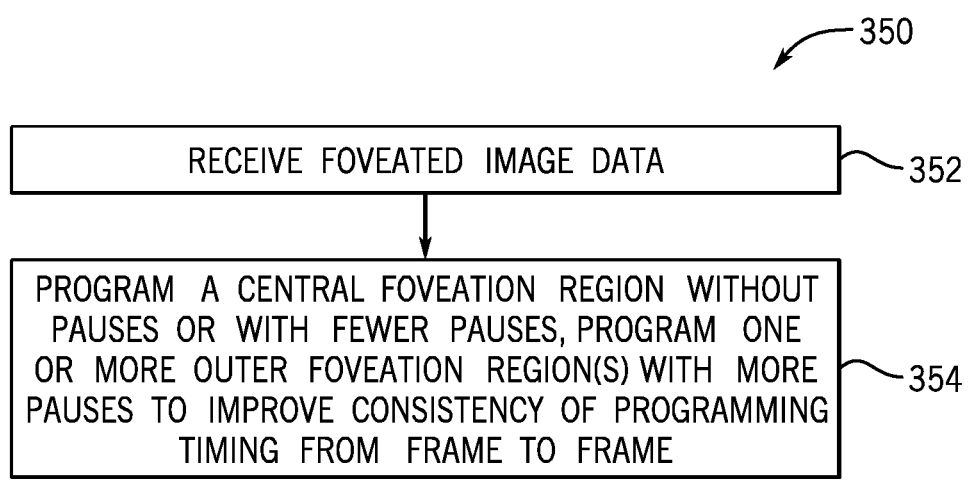
FIG. 14 is a flowchart of an example process for programming the electronic device of FIG. 1 including the electronic display, according to embodiments of the present disclosure.

FIG. 14 is a flowchart of a method 350 for programming the electronic display 12 to for improved consistency of programming timing. While the method 350 is described using process blocks in a specific sequence, it should be understood that the present disclosure contemplates that the described process blocks may be performed in different sequences than the sequence illustrated, and certain described process blocks may be skipped or not performed altogether.

In an embodiment, eye tracking data is received. For example, the eye tracker 28 may output viewing characteristic parameters indicative of viewing characteristics with which a viewer's eye is viewing or is expected to view the display 12. The viewing characteristics may include the viewer's gaze angle, the viewer's gaze location, or a combination thereof. Additionally or alternatively, the FOV and a periphery region of the FOV may be determined based on the eye tracking data. Additionally or alternatively, foveated image data may be generated based on the eye tracking data.

At block 352, foveated image data may be received. The image data may include some pixels that are grouped together to display the same image data and some individual pixels for generating high resolution image content. As discussed herein, the image frame may be divided into multiple foveation regions that each use a respective pixel resolution.

At block 354, a central foveation region 150 is programmed without intra-frame pauses or with fewer intra-frame pauses and one or more outer foveation regions 152 are programmed with more intra-frame pauses to improve consistency of programming timing (e.g., programming profile) from frame to frame. As illustrated in FIG. 13, programming of the medium-resolution area 174 and/or the low-resolution area 176 may be faster than the programming of the high-resolution area 172. Similarly, programming of the central foveation region 150 may include individually programming the pixel rows while programming the outer foveation regions 152 may include concurrently programming two or more pixel rows. That is, individually programming the pixel rows may use more time than programming two or more pixel rows in parallel.

In an embodiment, programming of the central foveation region 150 may include one or more intra-frame pauses and programming of the outer foveation regions 152 may include intra-frame pauses. As discussed herein, an intra-frame pause refers to pausing the programming of a pixel row or a group of pixels rows. Inserting one or more intra-frame pauses may delay emission timing of the pixel and/or the pixel row, which may adjust the programming profile of the electronic display 12. By way of example, programming of the central foveation region 150 may include one or more intra-frame pauses to adjust the programming profile while programming of the outer foveation regions 152 may include two or more intra-frame pauses. By adding two or more intra-frame pauses during programming of the outer foveation regions 152, the emission timing of the outer foveation regions 152 may be similar or substantially similar to the central foveation regions 150. It may be appreciated that the outer foveation regions 152 may be programmed with more intra-frame pauses than the central foveation region 150 since programming the central foveation region 150 may be a use a maximum programming time. Similarly, the high-resolution area 172 may be programmed with one or more intra-frame pauses while the medium-resolution area 174 and/or the low-resolution area 176 may be programmed with two or more intra-frame pauses.

In other embodiments, programming of the central foveation region 150 may not include intra-frame pauses and programming of the outer foveation regions 152 may include one or more intra-frame pauses. As such, the emission timing of the outer foveation regions 152 may be delayed to match or substantially match the emission timing of the central foveation region 150. In this way, the programming profile of the electronic display 12 may be substantially uniform and programming timing from frame to frame may be improved.

Figure 15:
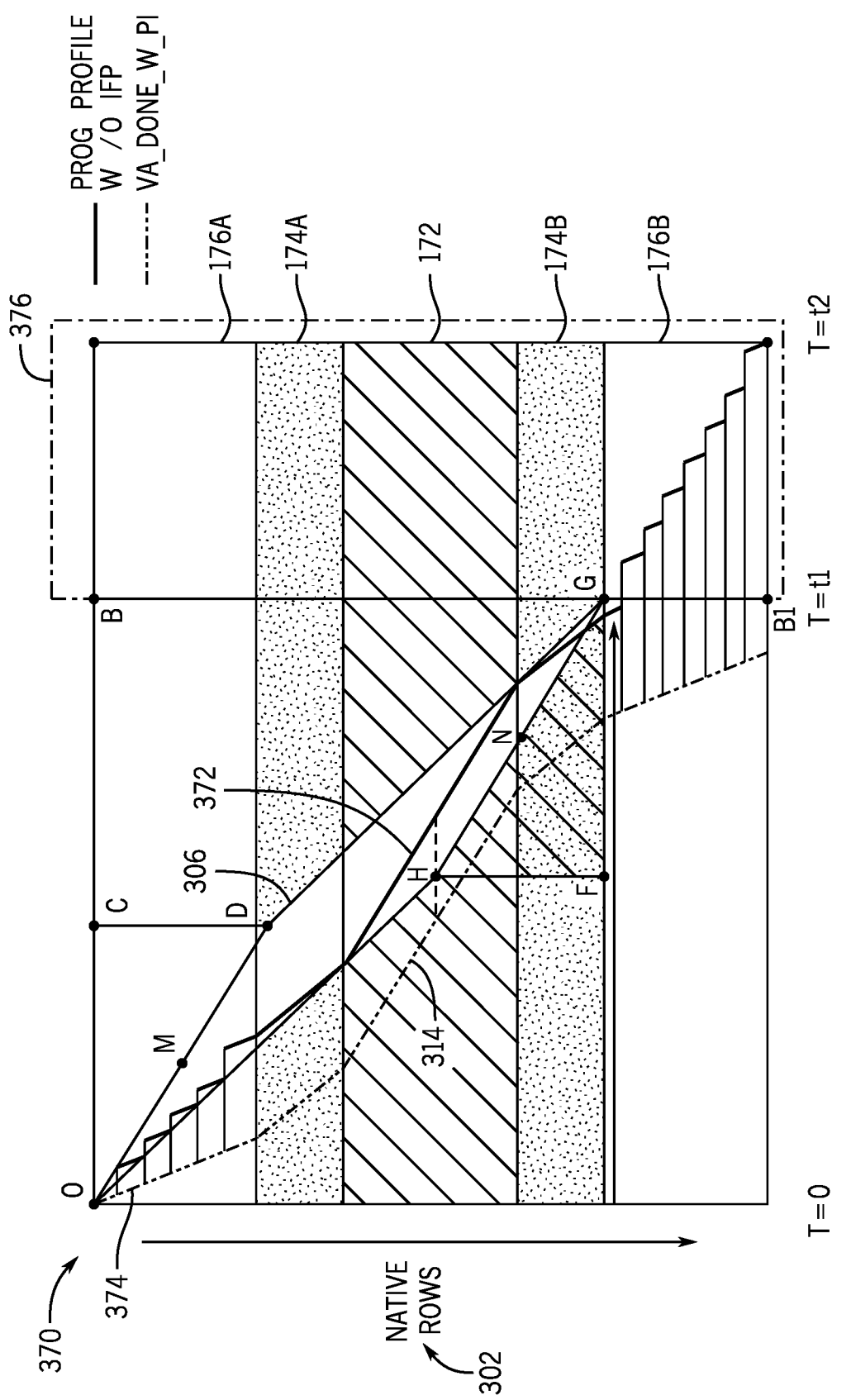
FIG. 15 is a diagram representing a programming profile for the electronic device of FIG. 1 using intra-frame pauses, according to embodiments of the present disclosure.

With the foregoing in mind, FIG. 15 is a graph 370 representing the programming profile 372 for the electronic device 10 with intra-frame pauses and/or delayed emission techniques. In particular, the graph 370 starts at Time T=0 and ends at Time T=t2. Programming the electronic display 12 using intra-frame pauses may delay the emission timing of the pixel rows which may increase an amount of time used to program the electronic device 10.

As illustrated, the graph 370 also includes the first programming profile 306 and the second programming profile 314. In the first low-resolution area 176A, the electronic display 12 may follow the second programming profile 314. The emission timing may be delayed by one or more intra-frame pauses. As illustrated by the red lines, the programming profile 372 may include one or more intra-frame pauses 374 that shift the programming timing. For example, five intra-frame pauses 374 may be used to delay the programming of the first low-resolution area 176A. A slope of the programming profile 372 within the first low-resolution area 176A may be similar or substantially similar to the slope of the second line segment 326 of the third programming profile 322 described with respect to FIG. 13. Additionally or alternatively, the slope of the programming profile 372 within the first low-resolution area 176A may be similar or substantially similar to the slope of the programming profile 372 within the first medium-resolution area 174A and/or the high-resolution area 172. In an embodiment, one or more intra-frame pauses may also be used in the first medium-resolution area 174A and/or the high-resolution area 172 to delay the emission timing.

The graph 370 also includes an overlap region 376 representing the time duration between the onset of delayed emission of the first pixel row and the time of end of programming the frame. For example, the overlap region 376 may start at T=t1 and end at T=t2. The second programming profile 314 may be extrapolated and one or more intra-frame pauses may be inserted to delay the emission timing of the corresponding pixel rows. As illustrated, seven intra-frame pauses 374 may be used during programming the second low-resolution area 176B. The intra-frame pauses 374 may delay emission timing of the native rows within the second low-resolution area 176B such that the emission timing is substantially similar to the emission timing of the high-resolution area 172. As such, programming consistency may be improved from frame to frame.

Figure 16:
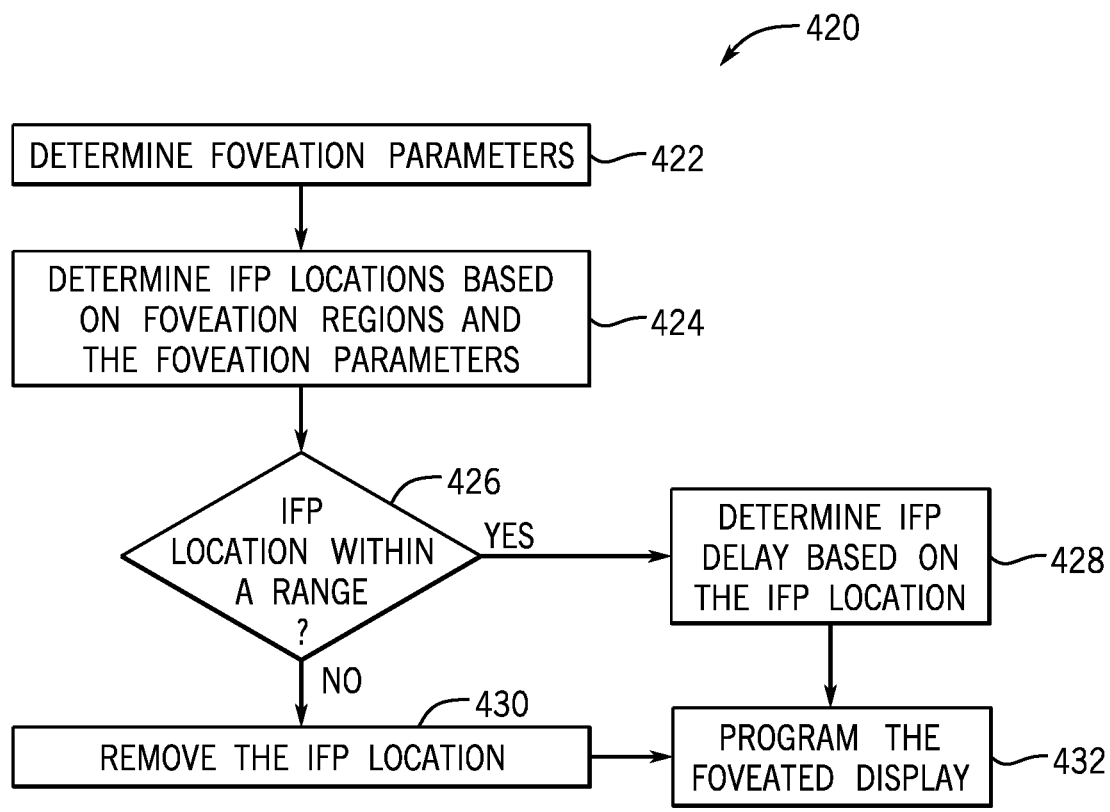
FIG. 16 is a flowchart of a process for determining intra-frame pauses based on foveated regions, in accordance with an embodiment.
Figure 17:
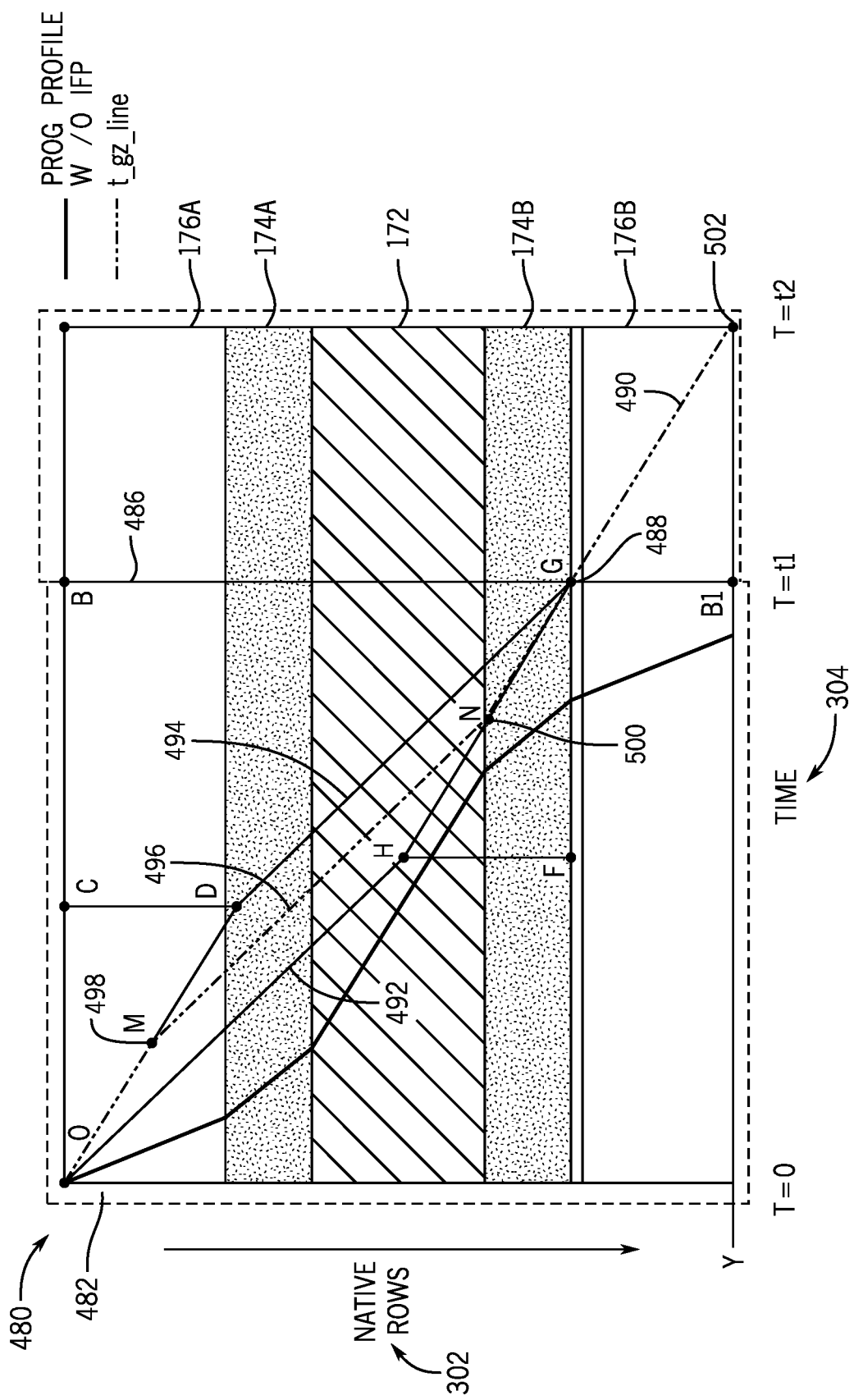
FIG. 17 is a block diagram of an example portion of the electronic device of FIG. 1 representing possible intra-frame pause locations, in accordance with an embodiment.
Figure 18:
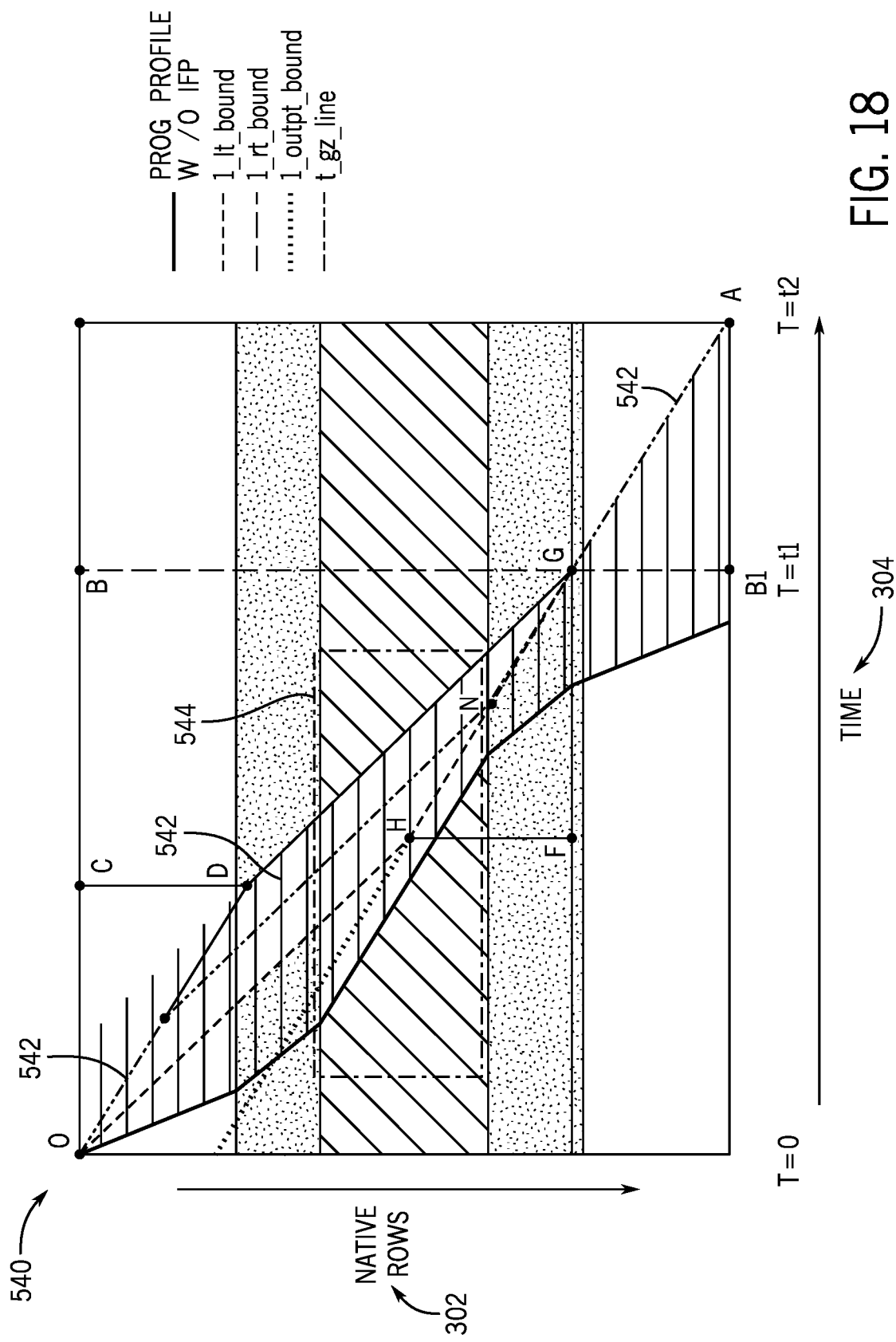
FIG. 18 is a diagram illustrating all possible intra-frame pause locations within the foveation regions, in accordance with an embodiment.

With the foregoing in mind, FIG. 16 is a flowchart of an example method 420 for determining duration and/or a number of intra-frame pauses to delay emission of certain foveation regions. While the method 420 of FIG. 16 is described using process blocks in a specific sequence, it should be understood that the present disclosure contemplates that the described process blocks may be performed in different sequences than the sequence illustrated, and certain described process blocks may be skipped or not performed altogether. FIG. 17 is an image frame 480 representing programming profiles of the electronic display 12 used to determine a duration and/or a number of the intra-frame pauses. FIG. 18 is a graph 540 representing all possible intra-frame pause locations within the foveation regions. To facilitate discussion, the method of FIG. 16 will be discussed in conjunction with the graphs of FIGS. 17 and 18.

The image frame 480 may be divided into a non-overlap region 482 and an overlap region 376. The non-overlap region 482 may include the time between the start of programming the image frame 480 (e.g., at T=0) and the onset of delayed emission of the first native row 302 (e.g., at T=t1). For example, the non-overlap region 482 may correspond to the amount of time used to program an image frame without intra-frame pauses. During dynamic foveation, one or more intra-frame pauses may be inserted to delay the programming of the native rows 302. The one or more intra-frame pauses may increase the programming time for the image frame from T=t1 to T=t2. For example, at a respective native row 302, the programming time of subsequent native rows 302 may cross into an overlap region 376. The overlap region 376 may be the time duration between the onset of delayed emission of the first native row 302 (e.g., at T=t1) and the time of end of programming the image frame with one or more intra-frame pauses (e.g., at T=T2). The time boundary of the overlap region 376 is marked by a line segment 486.

Programming within the overlap region 376 may be different from the non-overlap region 482. For example, the native rows 302 within the non-overlap region 482 may be programmed with a first set of constraints and the native rows 302 within the overlap region 376 may be programmed with a second set of constraints. A crossing point 488 be determined to represent the onset of a different set of constraints. For example, the programming constraints within the overlap region 376 may be determined by a slope of line segment 490. The length of line segment 490 may depend on the programming time of the native rows 302 within the overlap region 484. As such, the crossing point 488 may be determined based on an end of programming time, a native row index for a last native row, a starting time of delayed emission for the first native row, and a slope of the line segment 490.

At block 422, foveation parameters are determined. The foveation parameters may include one or more pre-computed terms that are a function of the viewer's gaze, such as the position of the central foveation region 150, the position of the outer foveation regions 152, a left programming boundary 492, a right programming boundary 494, a gaze line 496, and the like. The left programming boundary 492 representing a minimum programming time constraint for the first medium-resolution area 174A and/or the first low-resolution area 176A and a right programming boundary 494 representing a maximum programming time constraint for the second medium-resolution area 174B and/or the second low-resolution area 176B may be determined. The programming boundaries correspond to an acceptable deviation from the programming time of the high-resolution area 172. To this end, the programming boundaries may be a multiple of the programming time of the high-resolution area 172. The gaze line 496 represents the programming time for the vertical center of the gaze defined to be the center of the high-resolution area 172. In the non-overlap region 482, the gaze line 496 spans from a first point 498 (e.g., earliest time value) to a second point 500 (e.g., latest time value).

In the overlap region 484, the gaze line 496 spans from the second point 500 to a third point 502. Within the non-overlap region 482, the gaze line 496 slope may be equivalent to the display programming time per line. Within the overlap region 484, the gaze line 496 slope may be equivalent to a multiple of the programming time for the high-resolution area 172.

At block 424, intra-frame pause locations based on foveation regions and the foveation parameters are determined. Within the first low-resolution area 176A, the intra-frame pause duration may be determined based on the left programming boundary 492 and the programming time within the low-resolution area 176A. The programming time within the low-resolution areas 176 may be a quarter of the programming time used within the high-resolution area 172. Additionally or alternatively, spacing between each of the intra-frame pauses in the low-resolution area 176A may be determined such that the row programming time does not violate the left boundary programming. Similarly, the intra-frame pause duration within the first medium-resolution area 174A and/or the second medium-resolution area 174B may be determined based on the left programming boundary and the programming time for the medium-resolution area 174A, which may be half the programming time of the high-resolution area 172. Additionally or alternatively, the intra-frame pauses for the second medium-resolution area 174B may be determined based on the left programing boundary 492.

Within the overlap region 376, the intra-frame pause for the second low-resolution area 176B may be determined using the line segment 490 and the programming time of the low-resolution area 176. To this end, the second programming profile 314 may be extrapolated for time T=t1 to T=t2 to determine the programming time. The intra-frame pause may be determined based on the extrapolated programming time and the line segment 490. In this way, all possible intra-frame pause locations for each of the resolution areas may be determined.

At determination block 426, the intra-frame pause locations are compared to a range. As illustrated in the graph 540, all possible intra-frame pause locations 542 for each of the resolution areas may be determined. The intra-frame pause locations 542 may be compared to one or more constraints and pruned (e.g., removed) if the one or more constraints are not met. For example, one or more intra-frame pause locations 542 within the first low-resolution area 176A may be removed if the intra-frame pause location 542 is not within a minimum vertical distance between a current intra-frame pause location and a first native row 302 of the high-resolution area 172, and/or if the intra-frame pause location 542 is not within a minimum vertical distance between a current intra-frame pause location and a first native row of the medium-resolution area 174A.

Similarly, within the first medium-resolution area 174A and/or the second medium-resolution area 174B, intra-frame pause locations 542 may be removed if two constraints are not met. First, one or more intra-frame pause locations 542 may be removed if it is not within a minimum vertical distance between a current intra-frame pause location and a first native row 302 of the high-resolution area 172. Additionally or alternatively, one or more intra-frame pause locations 542 may be removed if it is not within the minimum vertical distance from the current intra-frame pause location and a native row 302 of a previous intra-frame pause location.

Additionally or alternatively, the intra-frame pause locations 542 within the high-resolution area 172 may be removed. As illustrated, a set of intra-frame pause locations 544 within the high-resolution area 172 may be removed. In certain embodiments, one or more intra-frame pause locations 542 may be kept and an additional constraint for the medium-resolution area 174 and/or the low-resolution area 176 may be to include more intra-frame pauses than the high-resolution area 172.

If the intra-frame pause location 542 is not within the range, then at block 428, the intra-frame pause locations 542 is removed. Within each resolution area, the intra-frame pause locations 542 may be removed if the respective constraints are not met.

If the intra-frame pause locations 542 are within the range, then at block 430, an intra-frame pause is determined based on the intra-frame pause location 542. For example, a duration and/or a position of the intra-frame pause location 542 may be determined.

At block 432, the foveated display is programmed. As discussed with respect to FIG. 15, native rows 302 within the first low-resolution area 176A and/or the second low-resolution area 176B may be programmed with one or more intra-frame pauses while native rows 302 within the high-resolution area 172, the first medium-resolution area 174A and/or the second medium-resolution area 174B may not be programmed with one or more intra-frame pauses. As such, the programming profile of the electronic display 12 may be similar or substantially similar across each of the resolution areas. In another embodiment, the low-resolution areas 176 and the medium-resolution areas 174 may be programmed with one or more intra-frame pauses while the high-resolution area 172 may not be programmed with any intra-frame pauses. Still in another embodiment, all of the resolution areas may be programmed with one or more intra-frame pauses with an additional constraint that the low-resolution areas 176 and/or the medium-resolution areas 174 include more intra-frame pauses in comparison to the high-resolution area 172.

Figure 19:
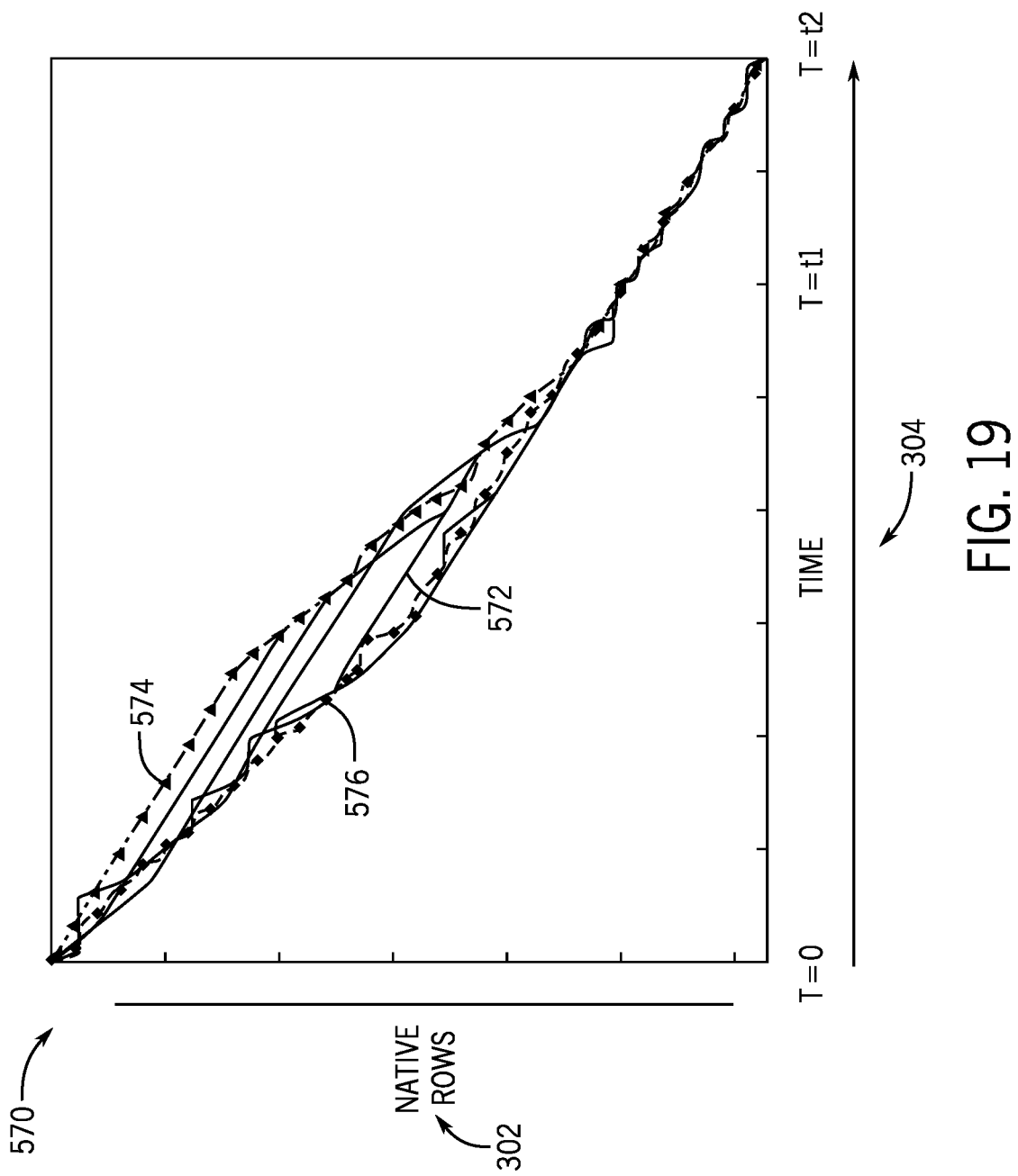
FIG. 19 is a diagram representing programming profiles with intra-frame pauses for different gaze angles, according to embodiments of the present disclosure.

With the foregoing in mind, FIG. 19 illustrates a graph 570 representing programming profiles for the various resolution areas of the electronic display 12 using the intra-frame pauses and/or delayed emission techniques. In particular, the graph 570 illustrates a first programming profile 572 (e.g., the third programming profile 322 described with respect to FIG. 13) when the gaze angle is at the center, a second programming profile 574 when the viewer's gaze is at the first edge, and a third programming profile 576 when the viewer's gaze is at the second edge. With the intra-frame pauses and delayed emission techniques, the second programming profile 574 and/or the third programming profile 576 are substantially similar to the first programming profile 572. In this way, programming consistency from frame to frame may be improved. As such, perceivable image artifacts from frame to frame may be reduced or eliminated.

Figure 20:
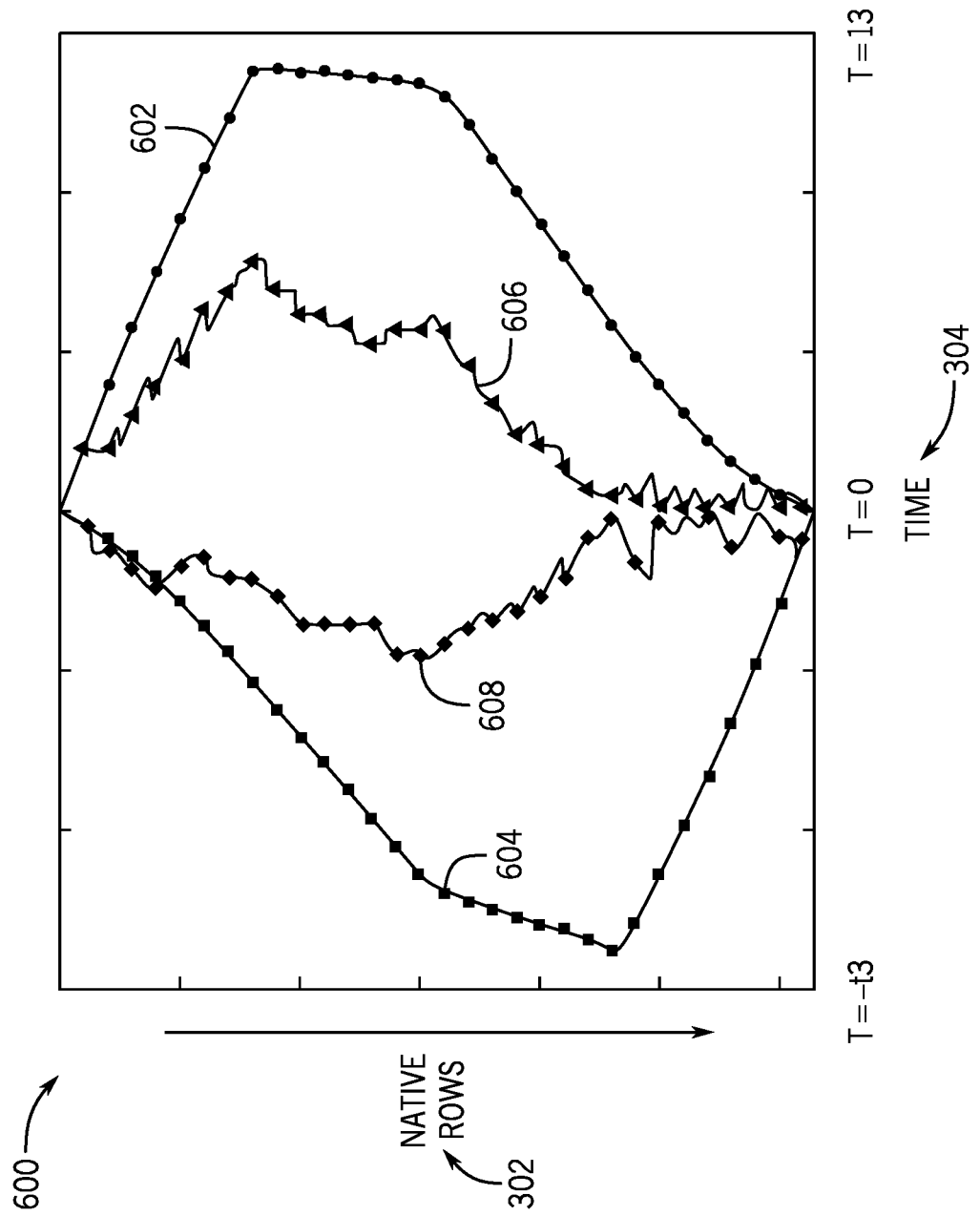
FIG. 20 is a diagram representing a positive and negative spread from a mean programming profile, according to embodiments of the present disclosure.

FIG. 20 illustrates a graph 600 representing a variation of the programming profiles with respect to a mean with and without intra-frame pauses and/or delayed emission techniques. As discussed with respect to FIG. 13, the third programming profile 322 corresponding to the viewer's gaze being at the center of the electronic display 12 may be a mean between the first programming profile 306 and the second programming profile 314. The graph 600 includes a positive spread from time T=0 to time T=t3 and a negative spread from time T=0 to time T=−t3. The spread represents a programming time difference between a respective programming profile and the mean.

As illustrated, the graph 600 includes a first spread 602 illustrating a difference between the first programming profile 306 without intra-frame pauses described with respect to FIG. 13 and the mean as well as a second spread 604 illustrating a difference between the second programming profile 314 without intra-frame pauses and the mean. The graph 600 also includes a third spread 606 illustrating a difference between the second programming profile 574 with intra-frame pauses described with respect to FIG. 19 and the mean as well as a fourth spread 608 with intra-frame pauses and the mean. Without intra-frame pauses, the earliest time a middle native row 302 may be programmed may be 1.2 milliseconds (ms), while using intra-frame pausing techniques may provide for the middle native row 302 to be programmed at 0.47 ms. Indeed, the deviation from the mean may be smaller when programming the native rows 302 with intra-frame pauses in comparison to the deviation when the native rows 302 are not programmed with intra-frame pauses. In other words, variation in programming times from frame to frame may be reduced. As such, perceivable image artifacts from frame to frame may be reduced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
   a display;
   an eye tracker configured to collect eye tracking data regarding a gaze of one or more of a user's eyes across the display; and
   processing circuitry coupled to the display and the eye tracker, the processing circuitry configured to:
      generate pixel data for each frame of a plurality of frames of content based at least in part on the eye tracking data, wherein each frame of the plurality of frames comprises a plurality of foveation grouping regions, the plurality of foveation grouping regions comprising a relatively high resolution grouping region associated with a first portion of the display and a relatively low resolution grouping region associated with a second portion of the display;
      determine a first programming profile of the first portion, wherein the pixel data is programmed individually into each pixel row;
      determine a second programming profile of the second portion, wherein the pixel data is programmed concurrently into two or more pixel rows;
      determine one or more positions to insert one or more intra-frame pauses into the second programming profile based on a comparison between the first programming profile and the second programming profile; and
      instruct the pixel data to be programmed into the second portion of the display based on the second programming profile and the one or more intra-frame pauses.

2. The electronic device of claim 1, wherein the processing circuitry is configured to instruct the pixel data to be programmed into the first portion without any intra-frame pauses.

3. The electronic device of claim 1, wherein the processing circuitry is configured to:
   instruct the pixel data to be programmed into the first portion with one or more intra-frame pauses; and
   instruct the pixel data to be programmed into the second portion with two or more intra-frame pauses.

4. The electronic device of claim 1, wherein the processing circuitry is configured to:
   determine a first programming time of the first portion, wherein the pixel data is programmed individually into each pixel row;
   determine a second programming time of the second portion, wherein the pixel data is programmed concurrently into two or more pixel rows; and
   determine a duration of the one or more intra-frame pauses based on a difference between the first programming time and the second programming time.

5. The electronic device of claim 1, wherein the processing circuitry is configured to:
   determine a programming profile for a third portion of the display, wherein the third portion of the display is associated with a low resolution grouping region.

6. The electronic device of claim 5, wherein the processing circuitry is configured to:
   instruct the pixel data to be programmed into the third portion with the one or more intra-frame pauses.

7. The electronic device of claim 5, wherein the processing circuitry is configured to:
   instruct the pixel data to be programmed into the third portion with more intra-frame pauses than the second portion.

8. The electronic device of claim 5, wherein the processing circuitry is configured to:
   determine a third programming profile of the third portion, wherein the pixel data is programmed concurrently into four or more pixel rows; and
   determine one or more additional positions to insert one or more intra-frame pauses into the third programming profile based on a comparison between the first programming profile and the third programming profile.

9. The electronic device of claim 1, wherein the eye tracking data is indicative of a viewer's gaze angle being at a top portion of the display, wherein the first portion corresponds to the top portion of the display, and wherein the second portion corresponds to a bottom portion of the display.

10. The electronic device of claim 9, wherein the processing circuitry is configured to instruct the pixel data to be programmed into the bottom portion of the display using the one or more intra-frame pauses.

11. The electronic device of claim 1, wherein the eye tracking data is indicative of a viewer's gaze angle being at a middle portion of the display, wherein the first portion corresponds to the middle portion to the display, and wherein the second portion comprises a first second portion adjacent to the first portion and a second portion adjacent to the first portion.

12. The electronic device of claim 11, wherein the processing circuitry is configured to instruct the pixel data to be programmed into the first second portion and the second portion using the one or more intra-frame pauses.

13. A tangible, non-transitory, computer readable medium storing instructions that when executed by one or more processors, cause the one or more processors to:
   determine a gaze position based on eye tracking data from an eye tracker of an electronic display;
   generate pixel data for a first frame of content displayed on the electronic display based at least in part on the eye tracking data and foveation data comprising a plurality of foveation group regions;
   determining a first amount of time for programming the pixel data into a first foveation group region of the plurality of foveation group regions, wherein one image pixel of the pixel data corresponds to one display pixel of the first foveation group region;

determining a second amount of time for programming the pixel data into a second foveation group region of the plurality of foveation group regions, wherein the one image pixel corresponds to two or more display pixels of the second foveation group region;

determining a duration and a number of one or more intra-frame pauses based on the first amount of time and the second amount of time; and instruct the pixel data to be programmed into the second foveation group region of the plurality of foveation group regions using one or more intra-frame pauses.

14. The tangible, non-transitory, computer readable medium of claim 13, comprising instructions that, when executed, cause the one or more processors to:

instruct the pixel data to be programmed into the first foveation group region of the plurality of foveation group regions without using the one or more intra-frame pauses.

15. The tangible, non-transitory, computer readable medium of claim 13, wherein the second amount of time is shorter than the first amount of time.

16. The tangible, non-transitory, computer readable medium of claim 13, wherein the first foveation group region comprises a higher pixel resolution in comparison to the second foveation group region.

17. A method, comprising:

generating, via processing circuitry, foveated image data based on eye tracking data from an eye tracker of an electronic display;

determining, via the processing circuitry, a first programming time corresponding to programming the foveated image data into a first foveation region of the electronic display;

determining, via the processing circuitry, a second programming time corresponding to programming the foveated image data into a second foveation region of the electronic display;

determining, via the processing circuitry, a duration and a number of intra-frame pauses to insert into the second programming profile based on a comparison between the first programming profile and the second programming profile;

instructing, via the processing circuitry, the foveated image data to be programmed into the first foveation region of the electronic display without any intra-frame pauses; and instructing, via the processing circuitry, the foveated image data to be programmed into the second foveation region of the electronic display with the number of intra-frame pauses.

18. The method of claim 17, wherein generating, via the processing circuitry, the foveated image data comprises:

determining, via the processing circuitry, a position of the first foveation region based on the eye tracking data, wherein the first foveation region corresponds to a relatively higher resolution; and determining, via the processing circuitry, a position of the second foveation region adjacent to the position of the first foveation region, wherein the second foveation region corresponds to a relatively lower resolution.

19. The method of claim 18, comprising:

receiving, via the processing circuitry, additional eye tracking data;

generating, via the processing circuitry, additional foveated image data based on the additional eye tracking data; and instructing, via the processing circuitry, the additional foveated image data to be programmed into a third foveation region of the electronic display, a fourth foveation region of the electronic display, and a fifth foveation region of the electronic display without any intra-frame pauses, the number of intra-frame pauses, or both.

20. The method of claim 19, wherein the third foveation region is positioned in a center of the electronic display, the fourth foveation region is positioned adjacent to a first edge of the electronic display, and the fifth foveation region is positioned adjacent to a second edge of the electronic display.

* * * * *